United States Patent
Tse et al.

(10) Patent No.: US 8,502,789 B2
(45) Date of Patent: Aug. 6, 2013

(54) METHOD FOR HANDLING USER INPUT IN AN INTERACTIVE INPUT SYSTEM, AND INTERACTIVE INPUT SYSTEM EXECUTING THE METHOD

(75) Inventors: Edward Tse, Calgary (CA); Jamie Duncalf, Calgary (CA); Min Xin, Calgary (CA); Cheng Guo, Calgary (CA)

(73) Assignee: SMART Technologies ULC (CA)

( * ) Notice: Subject to any disclaimer, the term of this patent is extended or adjusted under 35 U.S.C. 154(b) by 322 days.

(21) Appl. No.: 12/685,641

(22) Filed: Jan. 11, 2010

(65) Prior Publication Data

US 2011/0169748 A1   Jul. 14, 2011

(51) Int. Cl.
*G06F 3/041* (2006.01)

(52) U.S. Cl.
USPC ........... 345/173; 345/619; 345/660; 715/863; 434/128; 434/176

(58) Field of Classification Search
USPC ..... 345/156–184; 178/18.01–19.04; 715/863; 434/128, 160, 176, 192, 327; 726/28
See application file for complete search history.

(56) References Cited

U.S. PATENT DOCUMENTS

| | | | | |
|---|---|---|---|---|
| 2,471,271 A | * | 5/1949 | Green | 434/198 |
| 3,364,881 A | | 1/1968 | Kool | |
| 4,269,597 A | * | 5/1981 | Green | 434/198 |
| 4,372,631 A | | 2/1983 | Leon | |
| D270,788 S | | 10/1983 | Umanoff et al. | |
| D286,831 S | | 11/1986 | Matyear | |
| D290,199 S | | 6/1987 | Hampshire | |
| 4,710,760 A | | 12/1987 | Kasday | |
| D306,105 S | | 2/1990 | Newhouse | |
| D312,928 S | | 12/1990 | Scheffers | |
| D318,660 S | | 7/1991 | Weber | |
| D353,368 S | | 12/1994 | Poulos | |
| 5,448,263 A | | 9/1995 | Martin | |
| D372,601 S | | 8/1996 | Roberts et al. | |

(Continued)

FOREIGN PATENT DOCUMENTS

| | | |
|---|---|---|
| EP | 13115071 | 5/2003 |
| EP | 1876517 | 1/2008 |

(Continued)

OTHER PUBLICATIONS

Press Release Contact: Patricia Corsaut, "Intuilab introduces IntuiFace, An interactive table and its application platform", Nov. 30, 2007, Intuilab Press Release.

(Continued)

*Primary Examiner* — Alexander Eisen
*Assistant Examiner* — Sanjiv D Patel
(74) *Attorney, Agent, or Firm* — Katten Muchin Rosenman LLP

(57) ABSTRACT

An interactive input system comprises a display surface and processing structure communicating with the display surface. The processing structure presents on the display surface at least one graphic object, the graphic object having properties and a respective solution state comprising a value of at least one property. The processing structure in response to gesture input manipulates the value of the at least one property, and provides an indication as to whether the graphic object is in its solution state in response to the application of a predetermined amount of pressure against the display surface in association with the graphic object. A method and computer readable medium are also provided.

18 Claims, 7 Drawing Sheets

U.S. PATENT DOCUMENTS

| | | | |
|---|---|---|---|
| 5,559,961 A * | 9/1996 | Blonder | 726/18 |
| 5,708,460 A * | 1/1998 | Young et al. | 345/173 |
| 5,786,812 A * | 7/1998 | Yoshikawa et al. | 345/173 |
| 5,788,503 A * | 8/1998 | Shapiro et al. | 434/172 |
| 5,823,782 A * | 10/1998 | Marcus et al. | 434/156 |
| 6,061,177 A | 5/2000 | Fujimoto | |
| 6,141,000 A | 10/2000 | Martin | |
| 6,337,681 B1 | 1/2002 | Martin | |
| 6,339,748 B1 | 1/2002 | Hiramatsu | |
| D462,346 S | 9/2002 | Abboud | |
| D462,678 S | 9/2002 | Abboud | |
| 6,492,979 B1 * | 12/2002 | Kent et al. | 345/173 |
| 6,509,847 B1 * | 1/2003 | Anderson | 341/34 |
| 6,545,670 B1 | 4/2003 | Pryor | |
| 6,608,636 B1 | 8/2003 | Roseman | |
| 6,738,051 B2 | 5/2004 | Boyd et al. | |
| 6,747,636 B2 | 6/2004 | Martin | |
| 6,803,906 B1 | 10/2004 | Morrison et al. | |
| 6,855,053 B2 * | 2/2005 | Baerlocher | 463/16 |
| 6,867,886 B2 | 3/2005 | Lassen | |
| 6,972,401 B2 | 12/2005 | Akitt et al. | |
| 7,002,555 B1 | 2/2006 | Jacobsen et al. | |
| 7,084,859 B1 * | 8/2006 | Pryor | 345/173 |
| 7,129,927 B2 | 10/2006 | Mattsson | |
| 7,158,142 B1 * | 1/2007 | Fukuda | 345/581 |
| 7,176,904 B2 | 2/2007 | Satoh | |
| 7,187,489 B2 | 3/2007 | Miles | |
| 7,232,986 B2 | 6/2007 | Worthington et al. | |
| 7,236,162 B2 | 6/2007 | Morrison et al. | |
| 7,249,327 B2 * | 7/2007 | Nelson et al. | 715/782 |
| 7,274,356 B2 | 9/2007 | Ung et al. | |
| 7,327,376 B2 | 2/2008 | Shen et al. | |
| 7,372,456 B2 | 5/2008 | McLintock | |
| D571,365 S | 6/2008 | Morelock et al. | |
| D571,803 S | 6/2008 | Morelock et al. | |
| D571,804 S | 6/2008 | Morelock et al. | |
| 7,403,837 B2 | 7/2008 | Graiger et al. | |
| 7,411,575 B2 | 8/2008 | Hill et al. | |
| 7,515,143 B2 | 4/2009 | Keam | |
| 7,559,664 B1 | 7/2009 | Walleman et al. | |
| 7,593,593 B2 | 9/2009 | Wilson | |
| 7,630,002 B2 | 12/2009 | Jenkins | |
| 7,710,391 B2 | 5/2010 | Bell et al. | |
| 7,877,707 B2 * | 1/2011 | Westerman et al. | 715/863 |
| 2001/0012001 A1 | 8/2001 | Rekimoto | |
| 2003/0137494 A1 | 7/2003 | Tulbert | |
| 2004/0032401 A1 | 2/2004 | Nakazawa et al. | |
| 2004/0149892 A1 | 8/2004 | Akitt et al. | |
| 2004/0233235 A1 | 11/2004 | Rubin et al. | |
| 2005/0104860 A1 | 5/2005 | McCreary et al. | |
| 2005/0110964 A1 | 5/2005 | Bell | |
| 2005/0122308 A1 | 6/2005 | Bell | |
| 2005/0162381 A1 | 7/2005 | Bell | |
| 2005/0183035 A1 | 8/2005 | Ringel et al. | |
| 2005/0243070 A1 | 11/2005 | Ung et al. | |
| 2006/0020815 A1 * | 1/2006 | Varghese et al. | 713/182 |
| 2006/0026535 A1 * | 2/2006 | Hotelling et al. | 715/863 |
| 2006/0044282 A1 | 3/2006 | Pinhanez et al. | |
| 2006/0114244 A1 | 6/2006 | Saxena et al. | |
| 2006/0125803 A1 * | 6/2006 | Westerman et al. | 345/173 |
| 2006/0158425 A1 | 7/2006 | Andrews et al. | |
| 2006/0279558 A1 | 12/2006 | van Delden et al. | |
| 2006/0282660 A1 * | 12/2006 | Varghese et al. | 713/155 |
| 2006/0284851 A1 * | 12/2006 | Pittman | 345/173 |
| 2007/0024595 A1 * | 2/2007 | Baker et al. | 345/173 |
| 2007/0046775 A1 | 3/2007 | Ferren et al. | |
| 2007/0074910 A1 * | 4/2007 | Kesselman | 177/25.13 |
| 2007/0152984 A1 * | 7/2007 | Ording et al. | 345/173 |
| 2007/0273842 A1 | 11/2007 | Morrison et al. | |
| 2008/0029691 A1 | 2/2008 | Han | |
| 2008/0042978 A1 * | 2/2008 | Perez-Noguera | 345/168 |
| 2008/0084539 A1 | 4/2008 | Daniel | |
| 2008/0150890 A1 | 6/2008 | Bell | |
| 2008/0150913 A1 | 6/2008 | Bell | |
| 2008/0179507 A2 | 7/2008 | Han | |
| 2008/0234032 A1 | 9/2008 | de Courssou et al. | |
| 2008/0278460 A1 | 11/2008 | Arnett et al. | |
| 2009/0027357 A1 | 1/2009 | Morrison et al. | |
| 2009/0046110 A1 * | 2/2009 | Sadler et al. | 345/660 |
| 2009/0059730 A1 * | 3/2009 | Lyons et al. | 368/69 |
| 2009/0085881 A1 | 4/2009 | Keam | |
| 2009/0091539 A1 * | 4/2009 | Do et al. | 345/173 |
| 2009/0103853 A1 | 4/2009 | Daniel | |
| 2009/0109180 A1 | 4/2009 | Do et al. | |
| 2009/0128499 A1 | 5/2009 | Izadi | |
| 2009/0146972 A1 | 6/2009 | Morrison et al. | |
| 2009/0153519 A1 | 6/2009 | Suarez Rovere | |
| 2009/0189868 A1 * | 7/2009 | Joo et al. | 345/173 |
| 2009/0324095 A1 * | 12/2009 | Sakairi et al. | 382/203 |
| 2010/0001963 A1 | 1/2010 | Doray et al. | |
| 2010/0020025 A1 * | 1/2010 | Lemort et al. | 345/173 |
| 2010/0031203 A1 * | 2/2010 | Morris et al. | 715/863 |
| 2010/0073326 A1 | 3/2010 | Keam | |
| 2010/0079385 A1 | 4/2010 | Holmgren | |
| 2010/0079409 A1 | 4/2010 | Sirotich et al. | |
| 2010/0079493 A1 | 4/2010 | Tse et al. | |
| 2010/0083109 A1 | 4/2010 | Tse et al. | |
| 2010/0156045 A1 * | 6/2010 | Kahn et al. | 273/153 R |
| 2010/0162181 A1 * | 6/2010 | Shiplacoff et al. | 715/863 |
| 2010/0177049 A1 | 7/2010 | Levy | |
| 2010/0283747 A1 * | 11/2010 | Kukulski | 345/173 |
| 2010/0289807 A1 * | 11/2010 | Yu et al. | 345/581 |
| 2010/0321304 A1 * | 12/2010 | Rofougaran | 345/173 |

FOREIGN PATENT DOCUMENTS

| | | |
|---|---|---|
| GB | 2404127 | 1/2005 |
| JP | 08-205113 | 8/1996 |
| WO | WO 2004/090706 | 10/2004 |
| WO | WO 2005/034027 | 4/2005 |
| WO | WO 2006/095320 | 9/2006 |
| WO | WO 2009/146544 | 12/2009 |

OTHER PUBLICATIONS

Overview page for IntuiFace by Intuilab, Copyright 2008.

Jacob O. Wobbrock et al., "User-Defined Gestures for Surface Computing", CHI 2009, Apr. 4-9, 2009, Boston, Massachusetts, USA.

Martin Kaltenbrunner and Ross Bencina, "reacTIVision 1.4", Released May 19, 2009 (ReacTIVision 1.0 was released Nov. 29, 2005), retrieved from <http://reactivision.sourceforge.net/#usage> on Dec. 15, 2009.

Paul D'Intino, "How I Built ORION mt" May 11, 2008 taken from <http://orionmultitouch.blogspot.com/2008/05/how-i-built-orion-mt.html> on Nov. 23, 2009.

Villamor et al. "Touch Gesture Reference Guide", Apr. 15, 2010.

Touch Panel, vol. 5 No. 4 (Nov. 2010).

Touch Panel, vol. 5 No. 2-3 (Sep. 2010).

International Search Report and Written Opinion for PCT/CA2009/001357 dated Oct. 23, 2009.

International Search Report and Written Opinion for PCT/CA2009/001356 dated Jan. 4, 2010.

International Search Report and Written Opinion for PCT/CA2010/001085 mailed Oct. 12, 2010.

Douskos V., et al., "Fully Automatic Camera Calibration using Regular Planar Patterns", Laboratory of Photogrammetry, Department of Surveying, National Technical University of Athens (NTUA), GR-15780 Athens, Greece [online], Jun. 1, 2008; http://www.isprs.org/congresses/beijing2008/proceedings/5_pdf/04.pdf.

Douskos V., et al., "Fully Automatic of Digital Cameras Using Planar Chess-board Patterns", Department of Surveying, National Technical University of Athens (NTUA), GR-15780 Athens, Greece [online], May 1, 2007; http://www.survey.ntua.gr/main/labs/photo/staff/gkarras/Karras_O3DM_2007.pdf.

International Search Report and Written Opinion for PCT/CA2009/001358 dated Jan. 6, 2010.

International Search Report and Written opinion for PCT/CA2010/000002, dated Jun. 2, 2010.

International Search Report and Written Opinion for PCT/CA2009/001734 dated Feb. 23, 2010.

Hancock, M., et al. "Shallow-Depth 3D Interaction: Design and Evaluation of the One-, Two- and Three-Touch Techniques" In: CHI 2007, Proceedings of the SIGCHI Conference on Human Factors in Computing Systems, pp. 1147-1156, Apr. 28-May 3, 2007, San Jose, California.

Streitz, et al., "i-Land: an interactive landscape for creativity and innovation", Proceedings of CHI '99, 120-127.

Piper, et al. "SIDES: A Cooperative Tabletop Computer Game fo Social Skills Development", Proceedings of CSCW 2006, 1-10.

MacKenzie, "A note on the information theoretic basis for Fitts' Law", Journal of Motor Behavior, 21:323-330.

Hancock, et al. "Shallow-depth 3D interaction: design and evaluation of one-, two and three-touch techniques", in CHI '07: Proceedings of the SIGCHI Conference on Human Factos in Computing Systems, pp. 1147-1156. ACM, New York, NY USA.

Agarawal et al., "Keepin' it real: pushing the desktop metaphor with physics, piles, and the pen", in CHI '06: Proceedings of the SIGCHI Conference on Human Factors in Computing Systems, pp. 1283-1292. ACM, NY, NY, USA.

Balakrishnan et al. "Exploring bimanual camera control and object manipulation in 3D graphics interfaces." In CHI '99: Proceedings of the SIGCHI Conference on Human Factors in Computing Systems, pp. 56-62 (1999). ACM, New York, NY, USA.

Bers et al. "Interactive storytelling environments: coping with cardiac illness at Boston's Children's Hospital." In CHI '99: Proceedings of the SIGCHI Conference on Human Factors in Computing Systems, pp. 603-610 (1998). ACM Press/Addison-Wesley Publishing Co., New York, NY, USA.

Bradway "What is sandplay?" In Journal of Sandplay Therapy, vol. 15, No. 2, pp. 7-9 (2006).

Cao, et al. "Shapetouch: Leveraging contact shape on interactive surfaces." In TABLETOP 2008: 3rd IEEE International Workshop on Horizontal Interactive Human Computer Systems, pp. 129-136 (Oct. 2008).

Cassell, et al. "StoryMat: A playspace for collaborative storytelling." In CHI '99: Proceedings of the SIGCHI Conference on Human Factors in Computing Systems. ACM, New York, NY, USA (May 1999).

Cassell, et al. "Making space for voice: Technologies to support children's fantasy and storytelling." In Personal and Ubiquitous Computing, vol. 5, No. 3 (2001).

Davidson, et al. "Extending 2D object arrangement with pressure-sensitive layering cues." In UIST '08: Proceedings of the 21st annual ACM symposium on User Interface Software and Technology, pp. 87-90. ACM, New York, NY, USA (2008).

Dietz, et al. "DiamondTouch: a multi-user touch technology." In UIST '01: Proceedings of the 14th annual ACM symposium on User Interface Software and Technology, pp. 219-226. ACM, New York, NY, USA (2001).

Forlines, et al. "Under my finger: Human factors in pushing and rotating documents across the table." In Human-Computer Interaction—INTERACT 2005, vol. 3585, pp. 994-997. Springer Berlin / Heidelberg (2005).

Fröhlich, et al. "Physically-based manipulation on the Responsive Workbench." In IEEE Virtual Reality Conference 2000 (VR 2000), pp. 5-12 (Mar. 2000).

Gartner "Fast and robust smallest enclosing balls." In Proceedings of the 7th Annual European Symposium on Algorithms (ESA), pp. 325-338. Springer-Verlag (1999).

Garland, et al. "Surface simplification using quadric error metrics." In SIGGRAPH '97: Proceedings of the 24th annual conference on Computer graphics and interactive techniques, pp. 209-216. ACM Press/Addison-Wesley Publishing Co., New York, NY, USA (1997).

Michael Garland (1999). Quadric-based polygonal surface simplification. Ph.D. thesis, Carnegie Mellon University, Pittsburgh, PA, USA. Chair-Paul Heckbert.

Michael Garland (2004). "QSlim Simplification Software." Retrieved Mar. 4, 2009, URL http://mgarland.org/software/qslim.html.

Grossman et al.(Oct. 2007). "Going deeper: a taxonomy of 3D on the tabletop." In TABLETOP '07: Second Annual IEEE International Workshop on Horizontal Interactive Human-Computer Systems, pp. 137-144.

Jefferson Y. Han (2005). "Low-cost multi-touch sensing through frustrated total internal reflection." In UIST '05: Proceedings of the 18th annual ACM symposium on User Interface Software and Technology, pp. 115-118. ACM, New York, NY, USA.

Hancock, et al. (2006). "Rotation and translation mechanisms for tabletop interaction." In TABLETOP 2006: First IEEE International Workshop on Horizontal Interactive Human-Computer Systems, pp. 79-88. IEEE Computer Society, Los Alamitos, CA, USA.

Hancock, et al. (2007). "Supporting multiple off-axis viewpoints at a tabletop display." In TABLETOP '07: Second International Workshop on Horizontal Interactive Human-Computer Systems, pp. 171-178. IEEE Computer Society, Los Alamitos, CA, USA.

Hancock, et al. (2007). "Shallow-depth 3D interaction: design and evaluation of one-, two and three-touch techniques." In CHI '07: Proceedings of the SIGCHI Conference on Human Factors in Computing Systems, pp. 1147-1156. ACM, New York, NY, USA.

Hilliges, et al.(Jul. 2007). "Designing for collaborative creative problem solving." In C&C '07: Proceedings of the 6th ACM SIGCHI Conference on Creativity & Cognition. ACM, New York, NY, USA.

Hoppe, et al. (1993). "Mesh optimization." In Computer Graphics, vol. 27, no. Annual Conference Series, pp. 19-26.

Hoppe (1996). "Progressive meshes." In Computer Graphics, vol. 30, no. Annual Conference Series, pp. 99-108.

Ishii, et al. (2004). "Bringing clay and sand into digital design—continuous tangible user interfaces." In BT Technology Journal, vol. 22, No. 4, pp. 287-299.

Jacob, et al. (1994). "Integrality and separability of input devices." In ACM Transactions on Computer-Human Interaction, vol. 1, No. 1, pp. 3-26.

Kal. "Introduction to sandplay therapy." Retrieved Apr. 11, 2009, URL http://www.sandplay.org/intro to sandplay therapy.htm.

Yuri Kravchik. "JPhysX." Retrieved Mar. 4, 2009, URL http://www.jphysx.com/.

Russell Kruger, Sheelagh Carpendale, Stacey D. Scott and Anthony Tang (2005). "Fluid integration of rotation and translation." In CHI '05: Proceedings of the SIGCHI Conference on Human Factors in Computing Systems, pp. 601-610. ACM, New York, NY, USA.

Yang Li, Ken Hinckley, Zhiwei Guan and James A. Landay (2005). "Experimental analysis of mode switching techniques in pen-based user interfaces." In CHI '05: Proceedings of the SIGCHI Conference on Human Factors in Computing Systems, pp. 461-470. ACM, New York, NY, USA.

Jun Liu, David Pinelle, Samer Sallam, Sriram Subramanian and Carl Gutwin (2006). "TNT: improved rotation and translation on digital tables." In GI '06: Proceedings of Graphics Interface 2006, pp. 25-32. Canadian Information Processing Society, Toronto, Ontario, Canada.

Microsoft Corporation. "Microsoft Surface." Retrieved Jan. 20, 2009, URL http://www.surface.com/.

NVIDIA Corporation. "NVIDIA PhysX." Retrieved Jan. 20, 2009, URL http://www.nvidia.com/object/nvidiaphysx.html.

"ARB vertex buffer object." Retrieved Mar. 4, 2009, URL http://www.opengl.org/registry/specs/ARB/vertex bufferobject.txt.

Piper et al. (2008). "Supporting medical conversations between deaf and hearing individuals with tabletop displays." In CSCW '08: Proceedings of the 2008 ACM Conference on Computer Supported Cooperative Work, pp. 147-156. ACM, New York, NY, USA.

Jef Raskin (2000). The Humane Interface, chap. Meanings, Modes, Monotony and Myths. Addison-Wesley.

Adrian Reetz, Carl Gutwin, Tadeusz Stach, Miguel Nacenta and Sriram Subramanian (2006). "Superflick: a natural and efficient technique for long-distance object placement on digital tables." In GI '06: Proceedings of Graphics Interface 2006, pp. 163-170. Canadian Information Processing Society, Toronto, Ontario, Canada.

Kathy Ryall, Clifton Forlines, Chia Shen and Meredith Ringel Morris (2004). "Exploring the effects of group size and table size on interactions with tabletop shared-display groupware." In CSCW '04: Proceedings of the 2004 ACM Conference on Computer Supported Cooperative Work, pp. 284-293. ACM, New York, NY, USA.

Abigail J. Sellen, Gordon P. Kurtenbach and William A. S. Buxton (1992). "The prevention of mode errors through sensory feedback." In Human-Computer Interaction, vol. 7, No. 2, pp. 141-164.

"Simplified Wrapper and Interface Generator." Retrieved Mar. 4, 2009, URL http://www.swig.org/.

Lucia Terrenghi, David Kirk, Abigail Sellen and Shahram Izadi (2007)."Affordances for manipulation of physical versus digital media on interactive surfaces." In CHI '07: Proceedings of the SIGCHI Conference on Human Factors in Computing Systems, pp. 1157-1166. ACM, New York, NY, USA.

Greg Turk (1992). "Re-tiling polygonal surfaces." In SIGGRAPH Computer. Graph., vol. 26, No. 2, pp. 55-64.

Kristina Walter (2008). "Sand Play Therapy / Sandspieltherapie nach Dora M. Kal." Retrieved Apr. 11, 2009 (public domain), URL http://commons.wikimedia.org/wiki/File:Sandspiell.jpg.

Yao Wang, Assaf Biderman, Ben Piper, Carlo Ratti and Hiroshi Ishii. "Sandscape." Retrieved Jan. 20, 2009, URL http://tangible.media.mit.edu/projects/sandscape/.

Lance Williams (1978). "Casting curved shadows on curved surfaces." In SIGGRAPH Computer. Graph., vol. 12, No. 3, pp. 270-274.

Andrew D. Wilson, Shahram Izadi, Otmar Hilliges, Armando Garcia-Mendoza and David Kirk (2008). "Bringing physics to the surface." In UIST '08: Proceedings of the 21st annual ACM symposium on User Interface Software and Technology, pp. 67-76. ACM, New York, NY, USA.

Jacob O. Wobbrock, Andrew D. Wilson and Yang Li (2007). "Gestures without libraries, toolkits or training: a $1 recognizer for user interface prototypes." In UIST '07: Proceedings of the 20th annual ACM symposium on User Interface Software and Technology, pp. 159-168. ACM, New York, NY, USA.

Mike Wu and Ravin Balakrishnan (2003). "Multi-finger and whole hand gestural interaction techniques for multi-user tabletop displays." In UIST '03: Proceedings of the 16th annual ACM symposium on User Interface Software and Technology, pp. 193-202. ACM, New York, NY, USA.

Zagal, et al. (2004). "Kids telling fables through 3D animation." GVU Technical Report 23, Georgia Institute of Technology. URL http://hdl.handle.net/l853/3732.

Zagal, et al. (2006). "Social and technical factors contributing to successful 3D animation authoring by kids." GVU Technical Report 14, Georgia Institute of Technology. URL http://hdl.handle.net/l853/13120.

* cited by examiner

```
DraggableNeighbour n = null;
DraggableNeighbour n2 = null;
Point p1;
foreach (DraggableNeighbour neighbour in Neighbourhood)
{ //Clear the neighbour list
neighbour.Neighbours.Clear();
neighbour.Directions.Clear();
}
for (int i = 0; i < Neighbourhood.Count; ++i)
{
n = Neighbourhood[i];
p1 = new Point(n.TranslateTransform.X + (n.ActualWidth / 2),
n.TranslateTransform.Y + (n.ActualHeight / 2));
for (int j = i + 1; j < Neighbourhood.Count; ++j)
{
n2 = Neighbourhood[j];
Point p2 = new Point(n2.TranslateTransform.X + (n2.ActualWidth / 2),
n2.TranslateTransform.Y + (n2.ActualHeight / 2));
Double distance = CalculateDistance(p1, p2);
if (distance < 100 + 30)
{ //these two should be neighbours
//make their angles match
if (n.m_ContactsOnMe > 0 && n2.m_ContactsOnMe == 0)
{ //touch wins in first two cases
double AttachAngle = FindShortestAngle(n, n2);
if (false == NeighbourAlreadyExists(n, AttachAngle))
{
n2.Angle = n.Angle;
n2.Position = new Point(Math.Cos(InRadians(AttachAngle)) * 100 +
n.Position.X, Math.Sin(InRadians(AttachAngle)) * 100 + n.Position.Y);
SaveNeighbourship(n, n2, AttachAngle);
}
}
else if (n2.m_ContactsOnMe > 0 && n.m_ContactsOnMe == 0)
{
double AttachAngle = FindShortestAngle(n2, n);
if (false == NeighbourAlreadyExists(n2, AttachAngle))
{
n.Angle = n2.Angle;
n.Position = new Point(Math.Cos(InRadians(AttachAngle)) * 100 +
n2.Position.X, Math.Sin(InRadians(AttachAngle)) * 100 + n2.Position.Y);
SaveNeighbourship(n2, n, AttachAngle);
}
}
else if (n2.m_ContactsOnMe > 0 && n.m_ContactsOnMe > 0)
{ //bring them together, compromise the angle
double AverageAngle = (n2.Angle + n.Angle) / 2;
n2.Angle = AverageAngle;
n.Angle = AverageAngle;
}
//align their positions
}
}
```

FIG. 3C

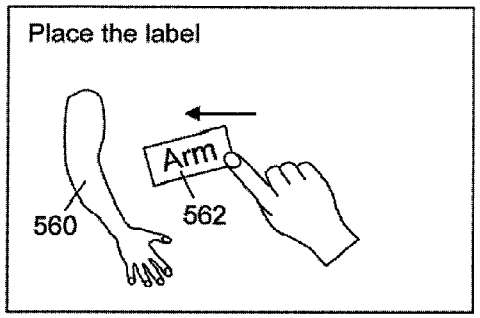
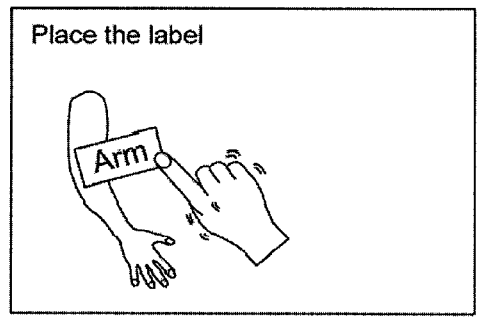
FIG. 15A  FIG. 15B
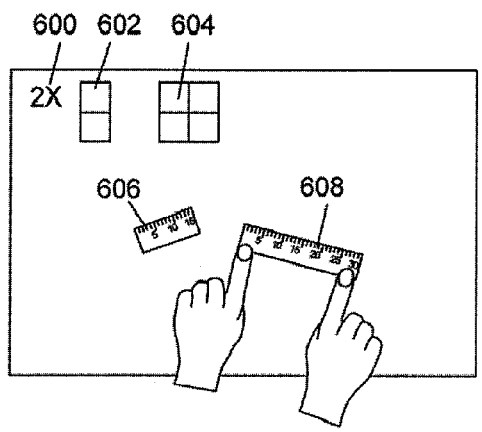
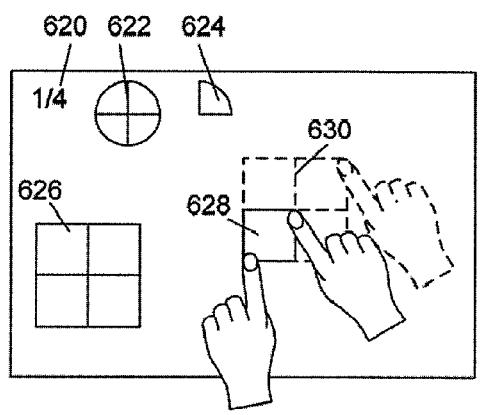
FIG. 17A  FIG. 17B
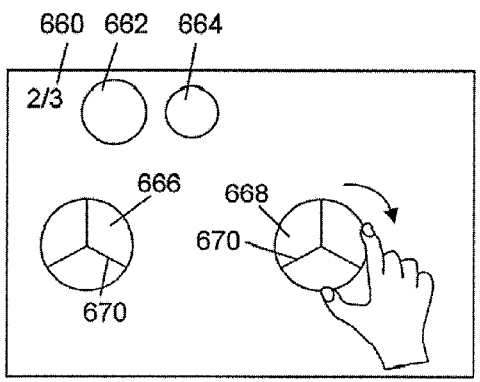
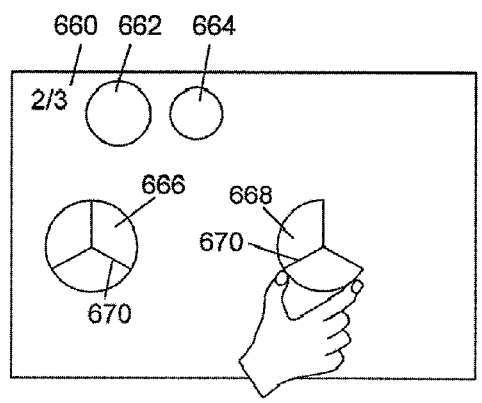
FIG. 17C  FIG. 17D

METHOD FOR HANDLING USER INPUT IN AN INTERACTIVE INPUT SYSTEM, AND INTERACTIVE INPUT SYSTEM EXECUTING THE METHOD

FIELD OF THE INVENTION

The present invention relates generally to interactive input systems and in particular to a method for handling user input in an interactive input system, and an interactive input system executing the method.

BACKGROUND OF THE INVENTION

Interactive input systems that allow users to inject input (i.e., digital ink, mouse events etc.) into an application program using an active pointer (e.g., a pointer that emits light, sound or other signal), a passive pointer (e.g., a finger, cylinder or other suitable object) or other suitable input device such as for example, a mouse or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 assigned to SMART Technologies ULC of Calgary, Alberta, Canada, assignee of the subject application, the contents of which are incorporated by reference; touch systems comprising touch panels employing electromagnetic, capacitive, acoustic or other technologies to register pointer input; tablet personal computers (PCs); laptop PCs; personal digital assistants (PDAs); and other similar devices.

Multi-touch interactive input systems that receive and process input from multiple pointers using machine vision are also known. One such type of multi-touch interactive input system exploits the well-known optical phenomenon of frustrated total internal reflection (FTIR). According to the general principles of FTIR, the total internal reflection (TIR) of light traveling through an optical waveguide is frustrated when an object such as a pointer touches the waveguide surface, due to a change in the index of refraction of the waveguide, causing some light to escape from the touch point ("contact point"). In a multi-touch interactive input system, the machine vision system captures images including the point(s) of escaped light, and processes the images to identify the position of the pointers on the waveguide surface based on the point(s) of escaped light for use as input to application programs. One example of an FTIR multi-touch interactive input system is disclosed in U.S. Patent Application Publication No. 2008/0029691 to Han.

Multi-touch interactive input systems are well-suited to educational and collaborative applications, due particularly to their ability to receive and react to input from multiple users. Several educational applications have been developed for the SMART Table™ multi-touch interactive input system offered by SMART Technologies ULC of Calgary, Alberta, Canada, the assignee of the present application.

Examples of the educational applications supported by the SMART Table™ platform are Paint, Multiple choice, Hot Spots, Basic Astronomy, Hungry Whale, Got Fish, Color Fun, Puzzle, Addition, Tilt Table, Touch Challenge, and Drum Fun. In general, these educational applications each allow multiple users to manipulate one or more displayed graphic objects in various ways to establish answers to questions that have been posed, or solutions to presented problems. For example, the Puzzle application is strongly analogous to a traditional jigsaw puzzle, in that users are asked to manipulate puzzle pieces, each embodied as a graphic object, so as to move the puzzle pieces to predefined locations on the touch screen. Depending upon the particular puzzle, it may be required to move each puzzle piece to a fixed location on the touch screen, or simply to a particular position in relation to the other puzzle pieces thereby to complete assembly of the puzzle. According to the particular puzzle being solved, it may be required to manipulate the puzzle pieces by rotating them and/or translating them. Once a puzzle piece has reached its predefined location, the puzzle application automatically provides an indication to the user. Similar to a traditional jigsaw puzzle, the Puzzle application considers the entire problem to have been solved when all puzzle pieces have been moved to their fixed or relative locations, at which point the user is automatically provided with an indication that the entire problem has been solved.

While known multi-touch applications are very useful for supporting education and collaboration, improvements to the scope of graphic object manipulation, and the method by which evaluation of the proposed solution is triggered, is desired. For example, in the Puzzle application described above, a user is typically able to randomly translate a puzzle piece on the display surface, such that if it accidentally coincides with its predefined location, the user is still provided with an indication. As would be understood, the ability to receive from the application a positive indication that the puzzle piece is in its correct location despite the user having merely guessed the solution, limits the educational value of the application.

It is therefore an object of the present invention to provide a novel interactive input system and method of configuring a graphic object in an interactive input system.

SUMMARY OF THE INVENTION

In accordance with an aspect, there is provided an interactive input system comprising:
a display surface; and
processing structure communicating with the display surface, the processing structure presenting on the display surface at least one graphic object, the graphic object having properties and a respective solution state comprising a value of at least one property, the processing structure in response to gesture input manipulating the value of the at least one property, and providing an indication as to whether the graphic object is in its solution state in response to the application of a predetermined amount of pressure against the display surface in association with the graphic object.

In accordance with another aspect, there is provided a method of handling user input in an interactive input system comprising:
presenting on a display surface of the interactive input system at least one graphic object, each graphic object having properties and a respective solution state comprising a value of at least one property;
in response to gesture input, manipulating the value of the at least one property; and
in response to the application of a predetermined amount of pressure against the display surface in association with the graphic object, providing an indication as to whether the graphic object is in its solution state.

In accordance with another aspect, there is provided a computer readable medium embodying a computer program for handling user input in an interactive input system, the computer program comprising:

program code presenting on a display surface of the interactive input system at least one graphic object, each graphic object having properties and a respective solution state comprising a value of at least one property;

program code manipulating the value of the at least one property in response to gesture input; and program code providing an indication as to whether the graphic object is in its solution state in response to the application of a predetermined amount of pressure against the display surface in association with the graphic object.

In accordance with another aspect, there is provided an interactive input system comprising:

a display surface; and processing structure communicating with the display surface, the processing structure presenting on the display surface at least one graphic object, the graphic object comprising a solution state that is the product of a predetermined value and a predetermined number of contact points on the graphic object, wherein the processing structure evaluates whether the graphic object is in its solution state by multiplying the current number of contact points on the graphic object with the predetermined value.

In accordance with another aspect, there is provided a method of handling user input in an interactive input system comprising:

presenting on a display surface of the interactive input system at least one graphic object, the graphic object comprising a solution state that is the produce of a predetermined value and a predetermined number of contact points on the graphic object; and evaluating whether the graphic object is in its solution state by multiplying the current number of contact points on the graphic object with the predetermined value.

In accordance with another aspect, there is provided a computer readable medium embodying a computer program for handling user input in an interactive input system, the computer program comprising:

program code presenting on a display surface of the interactive input system at least one graphic object, the graphic object comprising a solution state that is the produce of a predetermined value and a predetermined number of contact points on the graphic object; and program code evaluating whether the graphic object is in its solution state by multiplying the current number of contact points on the graphic object with the predetermined value.

In accordance with another aspect, there is provided an interactive input system comprising:

a display surface; and processing structure communicating with the display surface, the processing structure presenting on the display surface at least one graphic object, the graphic object having properties and a respective solution state comprising a value of at least one property, the graphic object also having configurable labels each associated with a value of the at least one property, the processing structure in response to gesture input manipulating the value of the at least one property while presenting the associated label instead of the property value.

In accordance with another aspect, there is provided a method of handling user input in an interactive input system comprising:

presenting on the display surface at least one graphic object, the graphic object having properties and a respective solution state comprising a value of at least one property, the graphic object also having configurable labels each associated with a value of the at least one property; and in response to gesture input, manipulating the value of the at least one property while presenting the associated label instead of the property value.

In accordance with another aspect, there is provided a computer readable medium embodying a computer program for handling user input in an interactive input system, the computer program comprising:

program code presenting on the display surface at least one graphic object, the graphic object having properties and a respective solution state comprising a value of at least one property, the graphic object also having configurable labels each associated with a value of the at least one property; and program code manipulating the value of the at least one property while presenting the associated label instead of the property value in response to gesture input.

The system, method and computer program described herein provide enhancements to the educational value of applications employing graphic objects in an interactive input system.

BRIEF DESCRIPTION OF THE DRAWINGS

Embodiments will now be described more fully with reference to the accompanying drawings in which:

FIG. 3C is a listing of software code for evaluating whether a graphic object is in a particular position with respect to another graphic object.

FIGS. 15A and 15B are illustrations of manipulation of the position of a graphic object using a translation gesture to reach a solution state for the graphic object that is dependent upon its relative position with respect to another graphic object.

FIGS. 17A, 17B, 17C and 17D are illustrations of manipulation of the position and size of graphic objects using translation and rotation gestures, respectively, to reach respective solution states that are dependent upon characteristics of other graphic objects.

DETAILED DESCRIPTION OF THE EMBODIMENTS

Figure 1A:
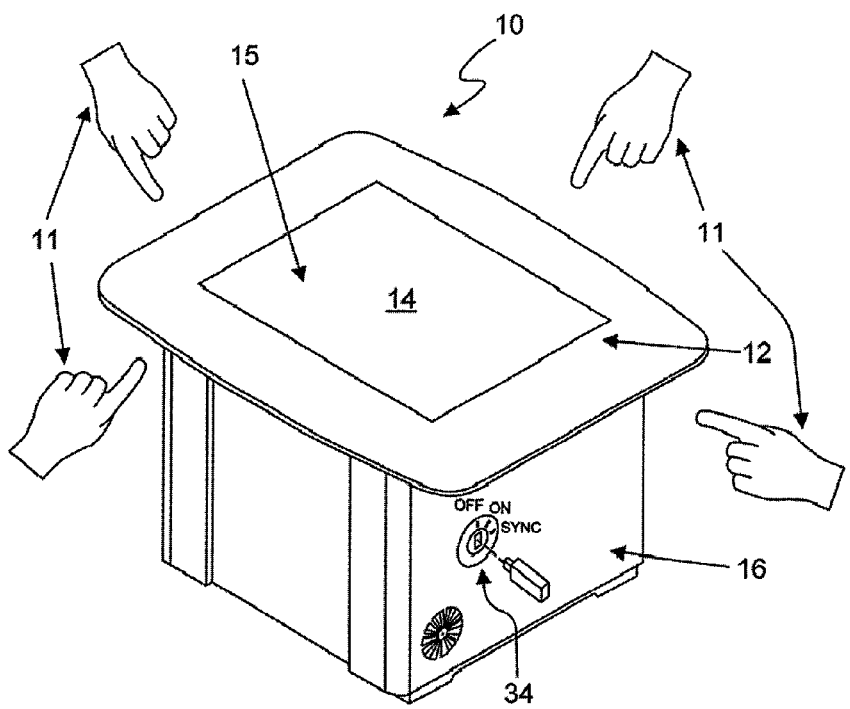
FIG. 1A is a perspective view of an interactive input system.
Figure 1B:
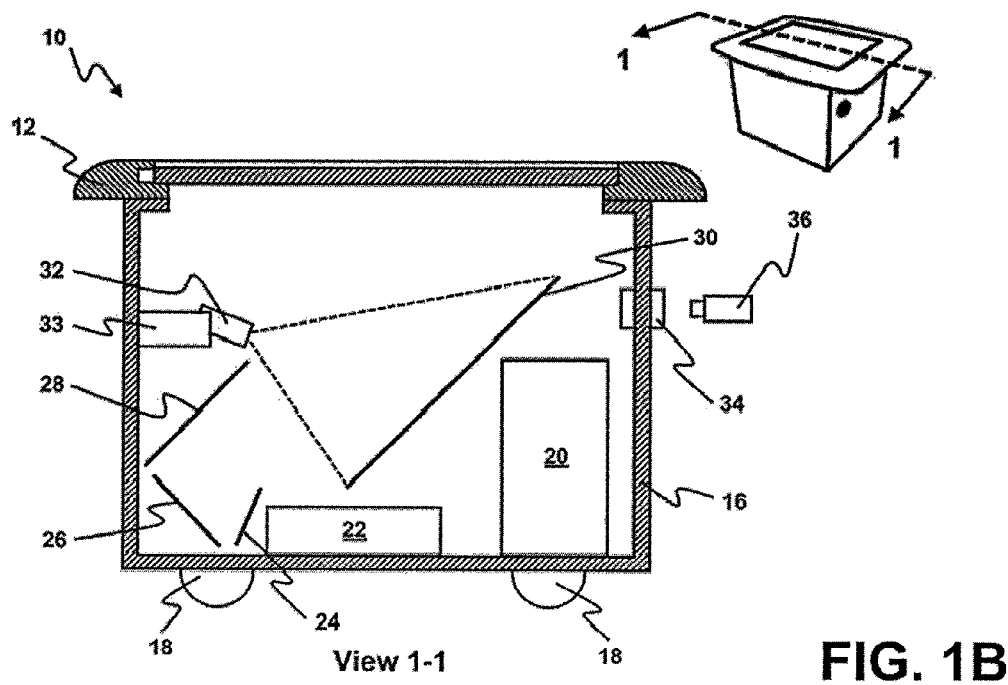
FIG. 1B is a side sectional view of the interactive input system of FIG. 1A.

Turning now to FIGS. 1A and 1B, a perspective diagram and sectional side view of an interactive input system in the form of a touch table are shown and is generally identified by reference numeral 10. Touch table 10 comprises a table top 12 mounted atop a cabinet 16. In this embodiment, cabinet 16 sits atop wheels, castors or the like 18 that enable the touch table 10 to be easily moved from place to place as requested. Integrated into table top 12 is a coordinate input device in the form of a frustrated total internal reflection (FTIR) based touch panel 14 that enables detection and tracking of one or more pointers 11, such as fingers, pens, hands, cylinders, or other objects, applied thereto.

Cabinet 16 supports the table top 12 and touch panel 14, and houses a processing structure 20 executing a host application and one or more application programs. Image data generated by the processing structure 20 is displayed on the touch panel 14 allowing a user to interact with the displayed image via pointer contacts on the display surface 15 of the touch panel 14. The processing structure 20 interprets pointer contacts as input to the running application program and updates the image data accordingly so that the image displayed on the display surface 15 reflects the pointer activity. In this manner, the touch panel 14 and processing structure 20 form a closed loop allowing pointer interactions with the touch panel 14 to be recorded as handwriting or drawing or used to control execution of the application program.

Processing structure 20 in this embodiment is a general purpose computing device in the form of a computer. The computer comprises for example, a processing unit, system memory (volatile and/or non-volatile memory), other non-removable or removable memory (a hard disk drive, RAM, ROM, EEPROM, CD-ROM, DVD, flash memory etc.) and a system bus coupling the various computer components to the processing unit.

During execution of the host software application/operating system run by the processing structure 20, a graphical user interface comprising a canvas page or palette (i.e., background), upon which graphic widgets are displayed, is displayed on the display surface of the touch panel 14. In this embodiment, the graphical user interface enables freeform or handwritten ink objects and other objects to be input and manipulated via pointer interaction with the display surface 15 of the touch panel 14.

The cabinet 16 also houses a horizontally-oriented projector 22, an infrared (IR) filter 24, and mirrors 26, 28 and 30. An imaging device 32 in the form of an infrared-detecting camera is mounted on a bracket 33 adjacent mirror 28. The system of mirrors 26, 28 and 30 functions to "fold" the images projected by projector 22 within cabinet 16 along the light path without unduly sacrificing image size. The overall touch table 10 dimensions can thereby be made compact.

The imaging device 32 is aimed at mirror 30 and thus sees a reflection of the display surface 15 in order to mitigate the appearance of hotspot noise in captured images that typically must be dealt with in systems having imaging devices that are aimed directly at the display surface itself. Imaging device 32 is positioned within the cabinet 16 by the bracket 33 so that it does not interfere with the light path of the projected image.

During operation of the touch table 10, processing structure 20 outputs video data to projector 22 which, in turn, projects images through the IR filter 24 onto the first mirror 26. The projected images, now with IR light having been substantially filtered out, are reflected by the first mirror 26 onto the second mirror 28. Second mirror 28 in turn reflects the images to the third mirror 30. The third mirror 30 reflects the projected video images onto the display (bottom) surface of the touch panel 14. The video images projected on the bottom surface of the touch panel 14 are viewable through the touch panel 14 from above. The system of three mirrors 26, 28, 30 configured as shown provides a compact path along which the projected image can be channeled to the display surface. Projector 22 is oriented horizontally in order to preserve projector bulb life, as commonly-available projectors are typically designed for horizontal placement.

An external data port/switch 34, in this embodiment a Universal Serial Bus (USB) port/switch, extends from the interior of the cabinet 16 through the cabinet wall to the exterior of the touch table 10 providing access for insertion and removal of a USB key 36, as well as switching of functions.

The USB port/switch 34, projector 22, and IR-detecting camera 32 are each connected to and managed by the processing structure 20. A power supply (not shown) supplies electrical power to the electrical components of the touch table 10. The power supply may be an external unit or, for example, a universal power supply within the cabinet 16 for improving portability of the touch table 10. The cabinet 16 fully encloses its contents in order to restrict the levels of ambient visible and infrared light entering the cabinet 16 thereby to facilitate satisfactory signal to noise performance. Doing this can compete with various techniques for managing heat within the cabinet 16. The touch panel 14, the projector 22, and the processing structure are all sources of heat, and such heat if contained within the cabinet 16 for extended periods of time can reduce the life of components, affect performance of components, and create heat waves that can distort the optical components of the touch table 10. As such, the cabinet 16 houses heat managing provisions (not shown) to introduce cooler ambient air into the cabinet while exhausting hot air from the cabinet. For example, the heat management provisions may be of the type disclosed in U.S. patent application Ser. No. 12/240,953 to Sirotich, et al., filed on Sep. 29, 2008 entitled "TOUCH PANEL FOR INTERACTIVE INPUT SYSTEM AND INTERACTIVE INPUT SYSTEM EMPLOYING THE TOUCH PANEL" and assigned to SMART Technologies ULC of Calgary, Alberta, the assignee of the subject application, the content of which is incorporated herein by reference.

Figure 1C:
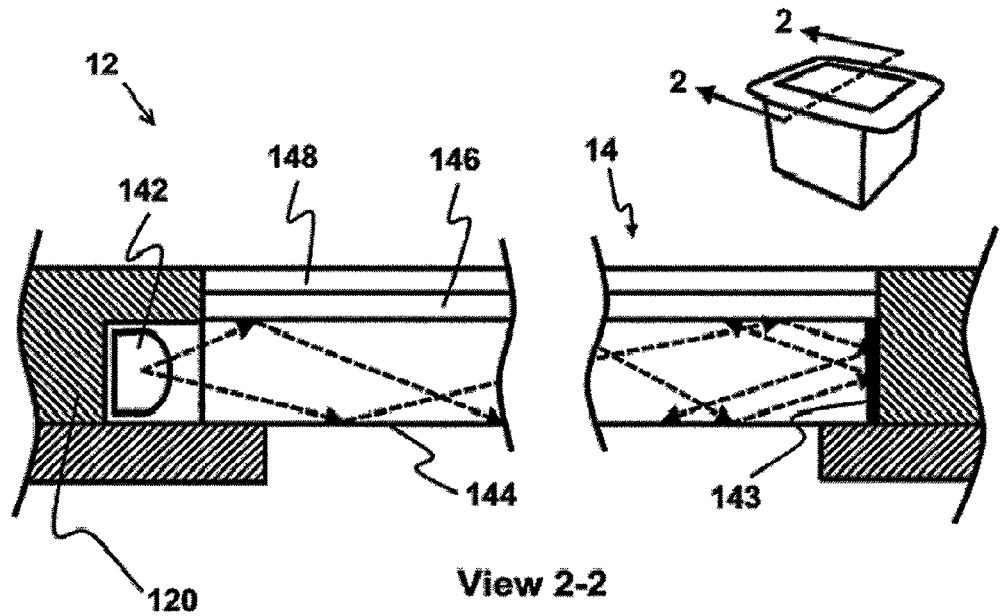
FIG. 1C is a sectional view of a table top and touch panel forming part of the interactive input system of FIG. 1A.

As set out above, the touch panel 14 of touch table 10 operates based on the principles of frustrated total internal reflection (FTIR), as described in further detail in the above-mentioned U.S. patent application Ser. No. 12/240,953 to Sirotich, et al., referred to above. FIG. 1C is a sectional view of the table top 12 and touch panel 14. Table top 12 comprises a frame 120 formed of plastic supporting the touch panel 14.

Touch panel 14 comprises an optical waveguide 144 that, according to this embodiment, is a sheet of acrylic. A resilient diffusion layer 146, in this embodiment a layer of V-CARE® V-LITE® barrier fabric manufactured by Vintex Inc. of Mount Forest, Ontario, Canada, or other suitable material lies against the optical waveguide 144.

The diffusion layer 146, when pressed into contact with the optical waveguide 144, substantially reflects the IR light escaping the optical waveguide 144 so that the escaping IR light travels down into the cabinet 16. The diffusion layer 146 also diffuses visible light being projected onto it in order to display the projected image.

Overlying the resilient diffusion layer 146 on the opposite side of the optical waveguide 144 is a clear, protective layer 148 having a smooth touch surface. In this embodiment, the protective layer 148 is a thin sheet of polycarbonate material over which is applied a hardcoat of Marnot® material, manufactured by Tekra Corporation of New Berlin, Wis., U.S.A. While the touch panel 14 may function without the protective layer 148, the protective layer 148 permits use of the touch panel 14 without undue discoloration, snagging or creasing of the underlying diffusion layer 146, and without undue wear on users' fingers. Furthermore, the protective layer 148 provides abrasion, scratch and chemical resistance to the overall touch panel 14, as is useful for panel longevity.

The protective layer 148, diffusion layer 146, and optical waveguide 144 are clamped together at their edges as a unit and mounted within the table top 12. Over time, prolonged use may wear one or more of the layers. As desired, the edges of the layers may be unclamped in order to inexpensively provide replacements for the worn layers. It will be understood that the layers may be kept together in other ways, such as by use of one or more of adhesives, friction fit, screws, nails, or other fastening methods.

An IR light source comprising a bank of infrared light emitting diodes (LEDs) 142 is positioned along at least one side surface of the optical waveguide 144. Each LED 142 emits infrared light into the optical waveguide 144. In this embodiment, the side surface along which the IR LEDs 142 are positioned is flame-polished to facilitate reception of light from the IR LEDs 142. An air gap of 1-2 millimetres (mm) is maintained between the IR LEDs 142 and the side surface of the optical waveguide 144 in order to reduce heat transmittance from the IR LEDs 142 to the optical waveguide 144, and thereby mitigate heat distortions in the acrylic optical waveguide 144. Bonded to the other side surfaces of the optical waveguide 144 is reflective tape 143 to reflect light back into the optical waveguide 144 thereby saturating the optical waveguide 144 with infrared illumination.

In operation, IR light is introduced via the flame-polished side surface of the optical waveguide 144 in a direction generally parallel to its large upper and lower surfaces. The IR light does not escape through the upper or lower surfaces of the optical waveguide 144 due to total internal reflection (TIR) because its angle of incidence at the upper and lower surfaces is not sufficient to allow for its escape. The IR light reaching other side surfaces is generally reflected entirely back into the optical waveguide 144 by the reflective tape 143 at the other side surfaces.

When a user contacts the display surface of the touch panel 14 with a pointer 11, the pressure of the pointer 11 against the protective layer 148 compresses the resilient diffusion layer 146 against the optical waveguide 144, causing the index of refraction on the optical waveguide 144 at the contact point of the pointer 11, or "touch point," to change. This change "frustrates" the TIR at the touch point causing IR light to reflect at an angle that allows it to escape from the optical waveguide 144 in a direction generally perpendicular to the plane of the optical waveguide 144 at the touch point. The escaping IR light reflects off of the point 11 and scatters locally downward through the optical waveguide 144 and exits the optical waveguide 144 through its bottom surface. This occurs for each pointer 11 as it contacts the display surface of the touch panel 114 at a respective touch point.

As each touch point is moved along the display surface 15 of the touch panel 14, the compression of the resilient diffusion layer 146 against the optical waveguide 144 occurs and thus escaping of IR light tracks the touch point movement. During touch point movement or upon removal of the touch point, decompression of the diffusion layer 146 where the touch point had previously been due to the resilience of the diffusion layer 146, causes escape of IR light from optical waveguide 144 to once again cease. As such, IR light escapes from the optical waveguide 144 only at touch point location (s) allowing the IR light to be captured in image frames acquired by the imaging device.

The imaging device 32 captures two-dimensional, IR video images of the third mirror 30. IR light having been filtered from the images projected by projector 22, in combination with the cabinet 16 substantially keeping out ambient light, ensures that the background of the images captured by imaging device 32 is substantially black. When the display surface 15 of the touch panel 14 is contacted by one or more pointers as described above, the images captured by IR camera 32 comprise one or more bright points corresponding to respective touch points. The processing structure 20 receives the captured images and performs image processing to detect the coordinates and characteristics of the one or more touch points based on the one or more bright points in the captured images. The detected coordinates are then mapped to display coordinates and interpreted as ink or mouse events by the processing structure 20 for manipulating the displayed image.

According to this embodiment, the size of each touch point is also detected, and is compared with the previously detected size of the same touch point for establishing a level of pressure of the touch point. For example, if the size of the touch point increases, the pressure is considered to increase. Alternatively, if the size of the touch point decreases, the pressure is considered to decrease.

Figure 2:
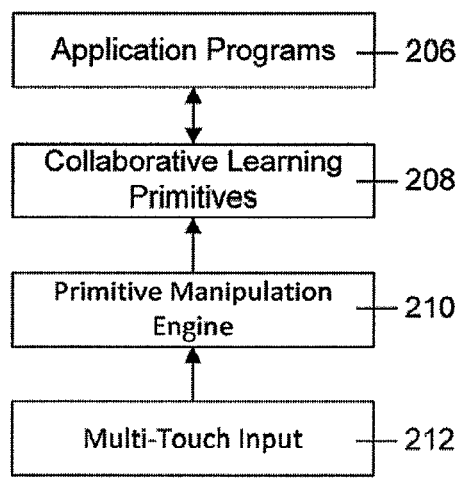
FIG. 2 is a block diagram illustrating the software structure of the interactive input system.

FIG. 2 is a block diagram illustrating the software structure of the touch table interactive input system 10. A primitive manipulation engine 210, part of the host application, monitors the touch panel 14 to capture touch point data 212 and generate contact events. The primitive manipulation engine 210 also analyzes touch point data 212 and recognizes known gestures made by touch points. The generated contact events and recognized gestures are then provided by the host application to the collaborative learning primitives 208 which include graphic objects 106 such as for example the canvas, buttons, images, shapes, video clips, freeform and ink objects. The application programs 206 organize and manipulate the collaborative learning primitives 208 to respond to user's input. At the instruction of the application programs 206, the collaborative learning primitives 208 modify the image displayed on the display surface 15 to respond to users' interaction.

The primitive manipulation engine 210 tracks each touch point based on the touch point data 212, and handles continuity processing between image frames. More particularly, the primitive manipulation engine 210 receives touch point data 212 from frames and based on the touch point data 212 determines whether to register a new touch point, modify an existing touch point, or cancel/delete an existing touch point. Thus, the primitive manipulation engine 210 registers a contact down event representing a new touch point when it receives touch point data 212 that is not related to an existing touch point, and accords the new touch point a unique identifier. Touch point data 212 may be considered unrelated to an existing touch point if it characterizes a touch point that is a threshold distance away from an existing touch point, for example. The primitive manipulation engine 210 registers a contact move event representing movement of the touch point when it receives touch point data 212 that is related to an existing pointer, for example by being within a threshold distance of, or overlapping an existing touch point, but having a different focal point. The primitive manipulation engine 210 registers a contact up event representing removal of the touch point from the surface of the touch panel 104 when reception of touch point data 212 that can be associated with an existing touch point ceases to be received from subsequent images. The contact down, move and up events are passed to respective collaborative learning primitives 208 of the user interface such as graphic objects 106, widgets, or the background or canvas 108, based on which of these the touch point is currently associated with, and/or the touch point's current position.

The users of the touch table 10 may comprise content developers, such as teachers, and learners. Content developers communicate with application programs running on touch table 10 to set up rules and scenarios. A USB key 36 (see FIG. 1B) may be used by content developers to store and upload to touch table 10 updates to the application programs with developed content. The USB key 36 may also be used to identify the content developer. Learners communicate with application programs by touching the display surface 15 as described above. The application programs respond to the learners in accordance with the touch input received and the rules set by the content developer.

Application programs 206 organize and manipulate collaborative learning primitives 208 in accordance with user input to achieve different behaviours, such as scaling, rotating, and moving. The application programs 206 may detect the release of a first graphic object over a second graphic object, and invoke functions that exploit relative position information of the objects. Such functions may include those functions handling object matching, mapping, and/or sorting. Content developers may employ such basic functions to develop and implement collaboration scenarios and rules. Moreover, these application programs 206 may be provided by the provider of the touch table 10 or by third party programmers developing applications based on a software development kit (SDK) for the touch table 10.

Figure 3A:
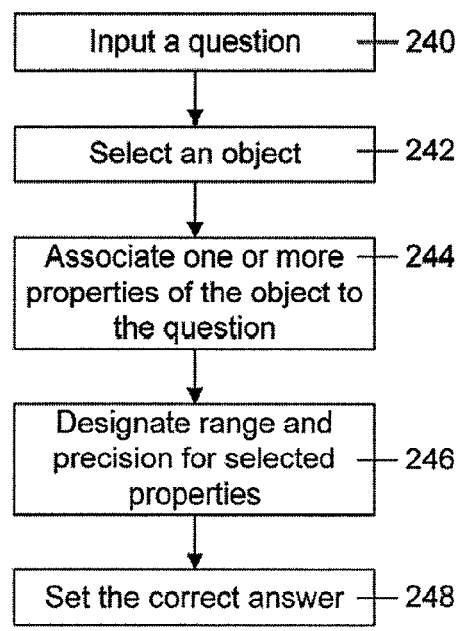
FIGS. 3A and 3B are flowcharts including steps for configuring a graphic object in the interactive input system.
Figure 3B:
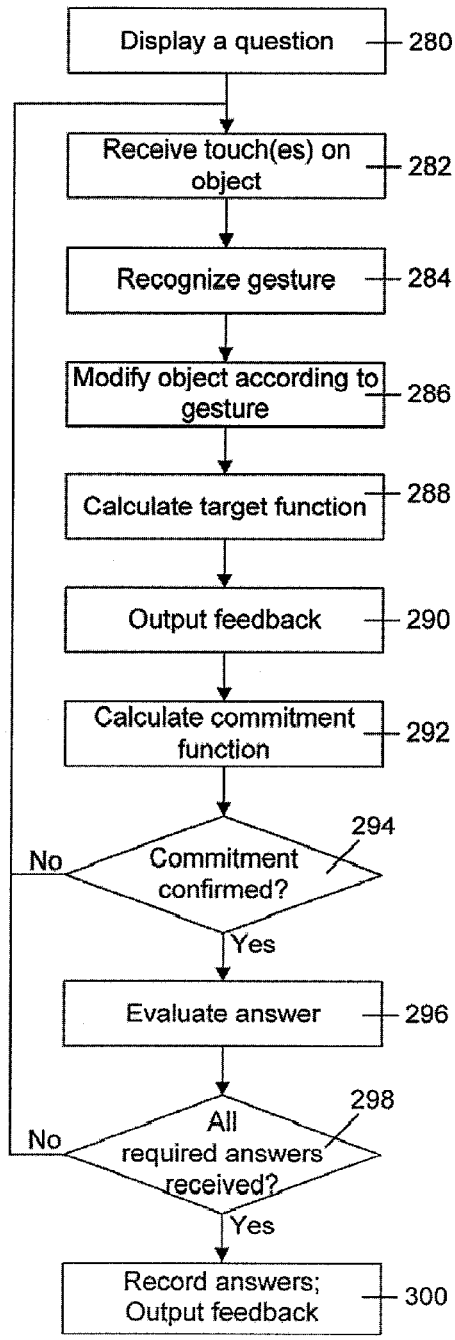

Configuring a graphic object according to the present embodiment is shown in the flowchart of FIGS. 3A and 3B. This process is executed in response to instructions from a user, such as a course instructor or curriculum provider, that have been provided by way of an administration toolbox, menus, or via the SDK.

At step 240, the table system accepts the instructor's input of a question or problem statement. The question is preferably brief, will have some instructive value to the expected reader of the question, such as a student, and will relate to the graphic object or objects to be associated with the question. Examples of questions/problem statements are: "Please Assemble This Puzzle"; "What Time Do We Eat Lunch?"; or "Please Use All Flashlights To Illuminate The Word 'Star'".

One or more graphic objects are then selected from a gallery (step 242). Each graphic object in the library has a plurality of respective properties. Examples of such properties include, but are not limited to, graphic object length, width, height, size, volume, central point position, angle with respect to the display surface, active areas and/or points (the area or points that may be interactive with other objects; by default the active area is the entire area of the object, and the active points are the central point and the border), neighboring relationship, number of touch points applied thereto, and touch pressure applied thereto.

In addition to the generally global properties referred to above, a graphic object may have additional, local properties. For example, a graphic object may have local properties that relate to sub graphic-objects of which the graphic object is comprised. For example, a thermometer graphic object may have a global property that relates to its size, but also have a local property that relates to the length of a sub graphic object that depicts the mercury on the thermometer. Because the graphic object has a local property for the length of the mercury, the mercury can be independently manipulated in length in order to increase or decrease the temperature level that is depicted by the thermometer graphic object.

At step 244, one or more properties of the selected graphic objects are selected in order to define a set of properties that can be manipulated by a user during execution of the application. At step 246, each selected property is assigned a value range. A precision level for the value range is also selected, such that the property value may be adjusted by a student to be within the level of precision of a solution value and still be considered equivalent to the solution value.

The values of the selected properties may be specified to be visible to the user of the interactive input system when manipulating the graphic object to reach its solution state. For example, if a selected property is length, the length value may be made to be visible so as to help the user gauge their solution while manipulating the length of the graphic object during use of the application. If the value of a selected property is to be made visible, the position and appearance (e.g., font, size, colour, animation etc.) for display of the value are adjustable. Preferably, default settings are provided in order to simplify configuration of the graphic object while providing flexibility for configuration.

At step 248, the solution state for the graphic object that corresponds to a solution to the question/problem statement is defined. The solution state comprises at least one value of at least one of the selected properties, but may comprise more than one value for a selected property, may comprise respective values for several of the selected properties, may comprise the value of one property depending upon another property, and/or may comprise the value of one property of the graphic object depending upon a property of another graphic object.

For example, the solution state may comprise simply the graphic object being at a particular position on the display surface. Thus, the graphic object is in its solution state if it is at that particular position, or within the precision range of the particular position. Another example is that the solution state comprises the graphic object being at a particular position on the display surface and also having a particular angle. Thus, the graphic object is in its solution state if it is in that particular position and is rotated to a particular angle. Another example is that the solution state comprises the length of the graphic object being a particular ratio of the width of the graphic object. Thus, for example, if the particular length:width ratio is defined as 16:9, the graphic object is in its solution state if it is manipulated to have a length:width ratio of 16:9. As a result, this solution state could be achieved with a length of 16 and width of 9, or alternatively with a length of 32 and a width of 18, and so forth. Yet another example is that the solution state comprises the length of the graphic object being a particular ratio of the length of another of the selected graphic objects. Thus, if the ratio is defined is 1:1, the graphic object is in its solution state if it is the same length as another of the selected graphic objects, whereas if the ratio is defined as 1:2 the graphic object is in its solution state if its length is half that of the other graphic object. Another example of a solution state is one comprising property values involving a target area defined by particular vertices of a rectangle/triangle or the like, with the position of the center point of the graphic object being within the target area. Yet another example of a solution state is the graphic object being within a threshold distance of another particular graphic object in a particular direction with respect to the graphic object. In this latter example, the first graphic object could depict the letters "onkey", the other graphic object depict the letter "m" and the threshold distance be twenty (20) pixels. Thus, the or a solution state of the first graphic object would be defined such that if it were within 20 pixels at its left from the other graphic object depicting "m", a solution state would be reached (the user would have spelt "monkey"). It would be understood in this latter example that another solution state might be defined to be the first graphic object being within 20 pixels at its left from a third graphic object depicting "d". In this case, a solution state would be reached by the user having spelt "donkey".

In each of these examples, manipulation of the graphic object is done in order to bring the graphic object to its solution state. In the present embodiment, manipulation is performed using gestures such as those assigned to translation, rotation, scaling and pressure. Advantageously, according to the present embodiment, such gestures may be configured to be associated with one or more properties of the graphic object in order to customize the behaviour of the graphic object. For example, with reference to the temperature gauge graphic object referred to above, the translation gesture may be associated with the length of the mercury sub graphic object, rather than associated with the position of the temperature gauge graphic object on the display surface. In this way, performing a translation gesture in connection with the temperature gauge graphic object, or in particular directions, would increase or decrease the length of the mercury sub graphic object but would not change the position of the temperature gauge graphic object as whole on the display surface, since the translation gesture would not have been associated with the temperature gauge. Thus, the user could adjust the temperature of the temperature gauge without translating the temperature gauge, in order to reach a solution state of the temperature being a particular value that answers the question.

By enabling the association of a gesture with a property, a large range of manipulation combinations can be achieved. For example, instead of the more usual scaling gesture of two contact points on a graphic object moving towards or away from each other effecting scaling, a rotation gesture may be associated with the length and width of the graphic object. Thus, the rotation gesture when applied to the graphic object would have the effect of scaling the graphic object, such that, for example, clockwise rotation would enlarge the graphic object, and counter-clockwise rotation would diminish the graphic object. Alternatively or in some combination, a pressure gesture could be associated with the angle of the graphic object, such that an increase in pressure would cause the graphic object to rotate clockwise, perhaps increasingly quickly, and a decrease in pressure would cause the graphic object to rotate slower, or even to rotate back counterclockwise to a given position. As just one other example, a rotation gesture might be associated with a local property such as the angle of rotation of a sub object of the graphic object, instead of the global angle of rotation of the graphic object itself. Thus, application of the rotation gesture would not rotate the entire graphic object, but would rotate a sub-object of the graphic object in order to cause the graphic object to reach its solution state. This level of flexibility provides a content provider with several options for configuring graphic objects in several ways to enrich the educational value of a particular application being developed.

In an embodiment, a question for each graphic object in an application is not required. For example, in a puzzle application, each puzzle piece graphic object would not require its own question. In this embodiment, a question may be established by an application that is associated with a super solution state, such that the solution states of more than one object must be reached in order to reach the super solution state. In the puzzle application, the super solution state is reached when each of the puzzle piece graphic objects is at its respective position as defined by its respective solution state. Preferably, the application is able to pre-configure solution states of graphic objects when a super solution state is being used. For example, when configuring a puzzle application, it is advantageous for the user configuring the application to be able to choose an image from a file system or a predefined library, and perhaps choose the number of puzzle pieces. The puzzle application would thereafter divide up the image into puzzle pieces, and define a number of graphic objects each depicting one of the puzzle pieces. The puzzle application would then automatically configure each of the graphic objects to have a solution state corresponding to a final position with respect to the display surface that corresponds to its position in the selected image. Alternatively, graphic sub objects may be handled in a similar manner such the graphic object has a solution state that requires that the sub graphic objects are in their respective solution states.

The super solution state may require only that a subset of all graphic objects with which it is associate be in its solution state. Thus, while solving of a jigsaw puzzle requires that all puzzle pieces be correctly located, and application may be developed that requires only the majority of graphic objects to be positioned in a predefined way. For example, a question may ask that each of four (4) "pin" graphic objects be positioned at a particular location on a world map, such as Calgary, Alberta. However, the solution state would be considered to have been arrived at if at least three (3) of the pin graphic objects were located at the position corresponding to Calgary.

At step 248, a commitment trigger for triggering an indication as to whether the graphic object is in its solution state is defined for the graphic object. The commitment trigger is advantageous because it provides an indication as to whether the graphic object is in its solution state only when "tripped". If a user is required to commit a proposed solution, it becomes more difficult for the user to stumble upon the solution state that if, for example, the user were able to randomly manipulate the graphic object and receive an automatic indication.

While certain applications would be useful without an explicit commitment trigger, such as those that encourage relatively free play for example manipulation of building blocks simply to create structures, other applications would gain greatly in their educational value. For example, in the event that the solution state requires that the temperature of the above-described temperature gauge graphic object be at a particular value, requiring a positive commitment to a particular temperature value would require more rigorous thought or recall by the user than would simply manipulating the mercury sub graphic object until it reached the solution state (e.g., a particular length) to receive an automatic indication.

The commitment trigger may itself invoke a routine that checks whether the graphic object is in its solution state. Alternatively, the graphic object may itself constantly keep track of whether it is in its own solution state, and the commitment trigger simply query the graphic object to receive a yes or no answer and accordingly provide an indication.

Preferably, where a super solution state is to be employed as described above, a super commitment trigger that determines whether each of the graphic objects is in its own solution state (by invoking respective routines or alternatively simply querying the graphic objects) is established. In a puzzle application, for example, once a user feels the puzzle has been assembled he or she could invoke the super commitment trigger at which point an indication would be provided as to whether in fact the puzzle piece graphic objects were all in their respective solution states.

The commitment and super commitment triggers may be particular gestures, or the selection of one or more other graphic objects. A commitment trigger may be established as contact point pressure level on the graphic object, or a contact point pressure level on the graphic object for a predetermined period of time, the selection of one or more other graphic objects such as OK buttons, another gesture reserved for commitment, or similar. In a puzzle application, for example, a puzzle piece graphic object commitment trigger might be established as an increase in pressure on the puzzle piece graphic object past a threshold for 1 second. Alternatively, a time commitment trigger is defined. In this case, an indication as to whether the graphic object is in its solution state is provided only once a touch point on the graphic object is maintained for a time longer than a predetermined threshold, such as one (1) second, and the graphic object has not otherwise been further manipulated to modify a property value.

The indication might be a brief change in colour of the puzzle piece graphic object to visually indicate that its solution state was reached if the puzzle piece graphic object is at or is within a threshold distance of its solution state position. Another visual indication might be a halo of white around the periphery of the graphic object. An audio indication might be provided alternatively or in some combination with the visual indication. For example, a buzz or a beep might be provided upon tripping of the commitment trigger in the event that the graphic object was in its solution state.

An indication might be provided in the form of the absence of an expected audio and/or visual indication. For example, if the user expects an audio and/or visual indication upon tripping of the commitment trigger when the graphic object is in its solution state, the absence of such an indication by its absence of an additional audio and/or visual indication in fact serves as an indication that the graphic object is not in its solution state.

It is preferred that the indication when the graphic object is in its solution state is of a first type, whereas the indication when the graphic object is not in its solution state is of a second, different type. This ensures that the user can clearly determine when the solution state has been reached, and when it has not. In one embodiment, the first type of indication is an audio indication, and the second type of indication is a visual indication. In another embodiment, the first type of indication is an audio indication, and the second type of indication is in fact the absence of an indication.

In an embodiment, the second type of indication is a hint. For example, in a puzzle application the tripping of the commitment trigger of a puzzle piece graphic object would, in the event that the puzzle piece graphic object is not in its solution state, highlight or otherwise change the colour of another graphic object that the graphic object is meant to be adjacent to. Thus, the user can commit to a proposed solution but in the event that the proposed solution does not place the graphic object into its solution state, the user is provided with some guidance as to how to bring the graphic object into its solution state.

FIG. 3B illustrates the flowchart of answering a question by the students using graphic objects configured as described above, according to some embodiments of this invention. At step 280, a question and its associated graphic objects are displayed on the display surface of the touch table 10. Based on the instructor's settings, the properties of the graphic objects associated with the question may also be shown at designated places in accordance with their designated appearances. When the touch table 10 receives one or more touches on the touch surface corresponding to the position of a graphic object (step 282), the touch table 10 recognizes the gesture represented by the touches (step 284) and manipulates the graphic object according to the properties that have been associated with the gestures (step 286). The student is able to manipulate the properties of the graphic objects through the defined ranges, and is thereby able to reach the solution state of the graphic object to answer the question. Manipulation in this way, depending upon the application, leads to the modification of the values of some properties affected by the gesture, the display of the objects, and/or, in some cases, the merging of graphic objects (for example to form a word from two graphic objects each depicting a portion of the word).

At step 288, an evaluation routine determines whether the graphic object is in its solution state based on the selected properties and their values. In this embodiment, the evaluation routine is performed independently of the tripping of the commitment trigger.

FIG. 3C shows an exemplary listing of software source code for an evaluation routine that calculates the neighboring relationship of a graphic object n with respect to other graphic objects n2 in a neighbourhood of graphic objects. This is done in order to determine whether graphic objects are proximate and whether, as a result, the graphic objects should be automatically aligned in angle and position.

Values of a property of a graphic object may be anywhere within a continuous range, and the solution state defined having a given level of precision as described above. However, in order to account for the possibility of noise interfering with exact contact point detection and positioning, and the imprecise nature of user's manipulation, it may be difficult for a user to precisely manipulate a property of a graphic object to a solution state value in order to answer a question. For example, a question requiring the student to precisely scale an object to twice its original size may not be feasible or easy to do within the operational constraints of the touch table.

In some embodiments, in order to improve the usability of the applications, when evaluating whether a graphic object has reached its solution state, the touch table system quantizes the actual value of the given property in accordance with a configured precision. Thus, if a change in value is smaller than half of the configured precision, the change is ignored in evaluating whether the solution state has been reached. Otherwise, the change is set to equal to the precision set by the instructor and used for evaluating the solution state. For example, if the precision set by the instructor is 50 pixels in length, a manipulation causing a change of 20 pixels in length would be ignored, while a manipulation causing a change of 30 pixels in length would be considered equivalent to a change of 50 pixels in length. The quantizing of property values may itself be employed to trigger an evaluation as to whether the graphic object is in its solution state only if the property value has changed enough to be considered equivalent to a different quantized value.

In an embodiment, if the change of a selected property is larger than a threshold, the object is "snapped" to the next level.

It is known that it can be difficult for users to discern between more than 4-6 levels of pressure. As such, in some embodiments that either employ pressure on a graphic object as a manipulation gesture or as a commitment trigger, at most 6 levels are selectable for configuring the graphic object.

At step 290, the system outputs feedback in accordance with the value of the manipulated property or properties. The feedback may be a revised display on the touch table (e.g., displaying the value of the selected properties), audio feedback, and/or other appropriate feedbacks.

At step 292, it is determined whether the user has tripped the commitment trigger. If, at step 294, it is determined that the commitment trigger has not been tripped, the process goes back to step 282. Otherwise, the process goes to step 296 to evaluate whether the graphic object is in its solution state. As previously described, a question associated with a super solution state will require multiple graphic objects to be in their solution states in order to reach the super solution state. If the results of the evaluation of solution states for all of the required graphic objects have been received (step 298), the received evaluation results are stored and, depending on whether the required solution states have been achieved, an indication is provided (step 300). Otherwise, the process goes back to step 282 to receive more results.

As would be understood, the above process is generally applicable to the situation where there is a graphic object having a solution state that requires the sub graphic objects to be in their respective solution states.

FIGS. 4A to 17D are illustrations of manipulation of property values of graphic objects using various gestures to reach their respective solution states. FIGS. 7A and 7B illustrate examples in which the time commitment trigger method is used, whereas the other examples used a pressure commitment method to trip the commitment trigger.

Figure 4A:
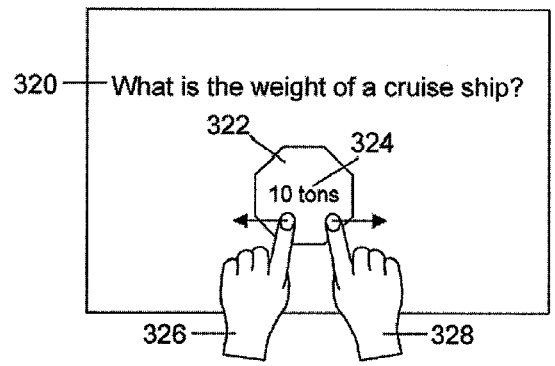
FIGS. 4A and 4B are illustrations of manipulation of the size of a graphic object using a scaling gesture to reach its solution state.
Figure 4B:
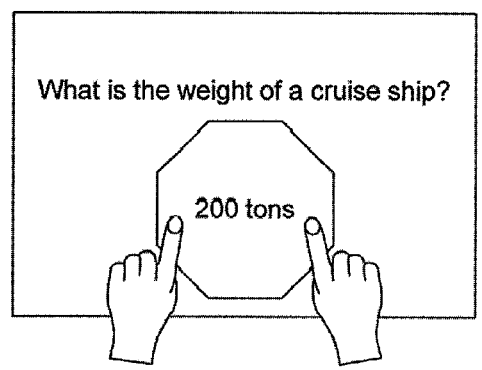

FIGS. 4A and 4B are illustrations of manipulation of the size of a graphic object 332 using a scaling gesture to reach its solution state that requires that the size of the graphic object 332 be a particular value. A question, in this case "What is the weight of a cruise ship?" is defined in connection with an octagon-shaped graphic object. An initial value, preferably a random value established by the application to be within a predetermined range but alternatively defined as a particular value when the graphic object was configured, is displayed inside the graphic object 332. In this embodiment, the initial value is "10 tons".

As the scaling gesture has been associated with the size of the graphic object 332, the student is able to perform the scaling gesture in connection with the graphic object 332 to change the size of the graphic object 332. This is done by applying two pointers (in this case fingers 324 and 326) to the object 322 and either moving the two pointers apart to enlarge the object, or moving the two pointers together to reduce its size.

As is shown in FIG. 4B, the value is increased in accordance with the size increase of the graphic object 322, and according to the precision with which the graphic object has been configured. It can be seen that, in this example, the manipulation of the graphic object 322 to modify its size results in a changing of the weight value and not specifically a size value. This example illustrates that the graphic object is not limited to being configured with values that directly correspond to the property configured to be manipulated. In this case, discrete values of the size property are associated with corresponding configurable labels, with the labels configured in this case to relate to weight instead of to size, in order to present respective weight labels while the size property is being manipulated. During configuration of the graphic object, the option is given to have the values of the property themselves displayed, or the configurable labels which relate to some other aspect for answering the question. It is preferable that the configurable labels are configured to relate to the question/problem statement.

Figure 5:
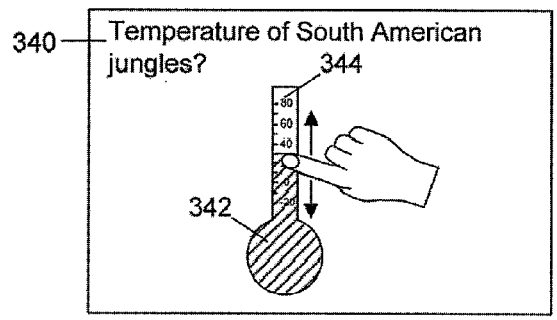
FIG. 5 is an illustration of manipulation of the length of a portion of a graphic object using a translation gesture to reach its solution state.

FIG. 5 is an illustration of manipulation of the length of a portion of a thermometer graphic object 342 using a translation gesture to reach its solution state corresponding to an answer to a question 340. In this example, the length property of a sub graphic object representing the mercury portion of the thermometer graphic object 342 is associated with the solution state. In this example, the value of the mercury sub-graphic is not shown; the thermometer graphic object 344 itself already shows a range of temperature values. In order to reach the solution state for thermometer graphic object 342, a user manipulates the mercury sub-graphic using a translation gesture to adjust its length. The user may trip the commitment trigger by increasing pressure on the display surface at any point corresponding to the thermometer graphic object 342 for a predetermined period of time, in order to receive an indication as to whether the particular length of mercury sub object (i.e., temperature) has caused the temperature gauge graphic object 342 to be in its solution state.

Figure 6A:
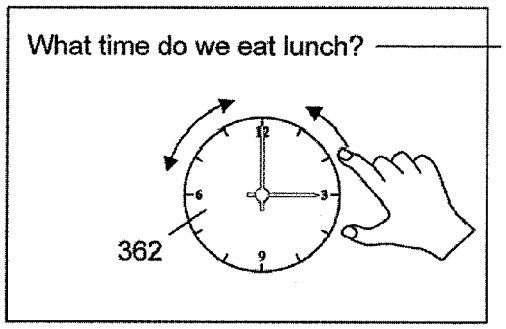
FIGS. 6A and 6B are illustrations of manipulation of the angle of rotation of a portion of a graphic object using a rotation gesture to reach its solution state.
Figure 6B:
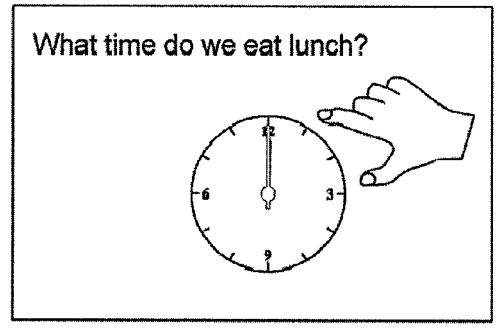
Figure 7A:
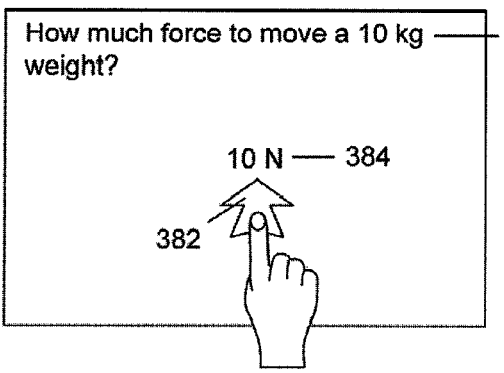
FIGS. 7A and 7B are illustrations of manipulation of the size of a graphic object using a pressure gesture to reach its solution state.
Figure 7B:
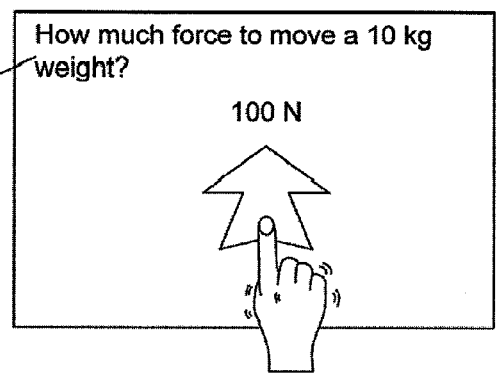

FIGS. 6A and 6B are illustrations of manipulation of the angle of rotation of a portion of a graphic object 362 using a rotation gesture to reach its solution state thereby to answer a question 360. The solution state of the graphic object 362 requires that the rotation angle property of an hour hand sub graphic object be at the 12 o'clock position of the graphic object 362. The rotation gesture is associated with the angle of rotation of the hour hand sub graphic object. Application of the rotation gesture in connection with the graphic object 362 manipulates the angle of the hour hand sub graphic object, and not the entire graphic object 362.

FIGS. 7A and 7B are illustrations of manipulation of the size of a graphic object 382 using a pressure gesture to reach its solution state thereby to answer a question 380. In this example, the solution state of the graphic object 382 requires that the size property reach a particular value. The current value 384 associated with the size property is also displayed. In this case, rather than the usual scaling gesture being associated with the size property, the pressure gesture is associated with the size property. Thus, by touching and applying pressure to the graphic object 382, the size of the graphic object 382 is manipulated, and the displayed value 384 is adjusted accordingly and in accordance with the precision (i.e., the step size) configured. In this case, the user is required to apply a pressure for a time exceeding a threshold level in order to reach the solution state of the graphic object 382.

Figure 8:
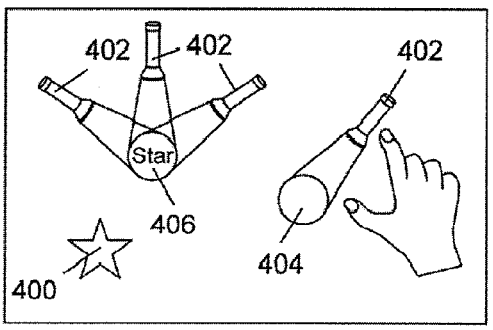
FIG. 8 is an illustration of manipulation of both the position and angle of rotation of graphic objects to reach their respect solution states.

FIG. 8 is an illustration of manipulation of both the position and angle of rotation of graphic objects to reach their respect solution states. For example, a graphic object 400 depicting a star is shown, and four students (not shown) are expected to use their spotlight graphic objects 402 to illuminate the hidden word "Star" that describes the object 400.

In this example, a super solution state requires that at least three of the four spotlight graphic objects are positioned and oriented with respect to the word "Star". More particularly, each spotlight object 402 comprises an active area 404, and three of the four active areas are required to coincide with the position of the word "Star" in order to satisfy the super solution state. Under initial conditions, the active areas 404 do not coincide with the position of the word "Star", and any word that coincides with the active area of a spotlight is shown. The users are required to move and to rotate their respective spotlight graphic objects 402 to put the active areas of their spotlight to a target area 406 encompassing the word "Star". In order to trip the super commitment trigger, at least three of the users are required to press down on their spotlight graphic objects 402 for a predetermined period of time without significant further movement or rotation.

Figure 9:
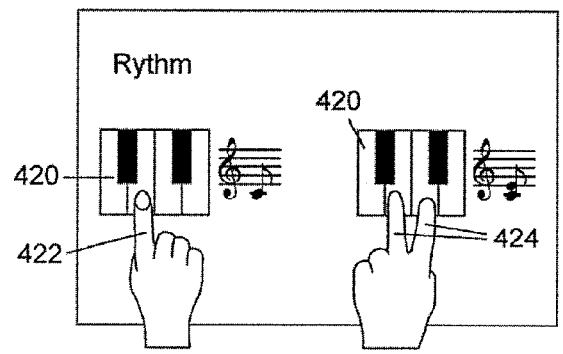
FIG. 9 is an illustration of manipulation of the number of touch points on a graphic object to reach multiple solution states for the graphic object.

FIG. 9 is an illustration of manipulation of the number of touch points on a piano keyboard graphic object 420 to reach multiple solution states for the graphic object. A graphic object of a complete keyboard or a piano could be employed to provide a more vivid depiction. The areas of appropriate keys are associated with respective solution states. When the student places one finger 422 on the particular key of the keyboard, the tonic note of the musical scale can be heard. When the student places two fingers 424 on the particular keys of the keyboard, the tonic and subdominant can be heard. Similarly, when the student places four fingers on the particular keys of the keyboard (such a situation is not explicitly shown in the figures), the tonic, subdominant, dominant, and leading tonic can be heard. In some embodiments, this keyboard may be provided with a timing sequence routine for establishing solution states involving coordinating of hand placement to rhythm.

Figure 10:
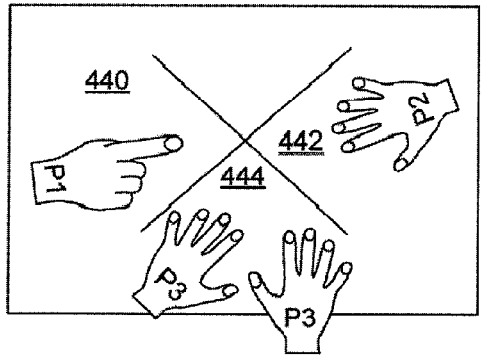
FIG. 10 is an illustration of manipulation of the number of touch points on a graphic object to reach a solution state for the graphic object.

FIG. 10 is an illustration of manipulation of the number of touch points on a graphic object to reach a solution state for the graphic object. This example illustrates the power of the system for building collaborative applications. FIG. 10 shows an exemplary scenario where three users P1, P2 and P3 vote for answering a particular question, which is not itself explicitly shown in the figures but would generally be viewable by the users. Each user is provided with a voting zone 440, 442 and 444, respectively, on a voting graphic object. The area of each voting zone is associated with a solution state. Users P1 and P2 are required to apply at least one hand to their respective voting zones 440 and 442, in order to vote, while student P3 is required to apply both hands to voting zone 444 to vote. The pressure applied by each user to their respective voting zone is detected. In the event that there are multiple contact points in a particular zone, the highest pressure detected among the multiple contact points, or the average of the multiple pressures, depending upon the desired implementation, are resolved as the pressure applied to the zone. As has been described above, the actual detected pressure is quantized (and may be considered a voting confidence level) according to a set of pressure levels configured for the voting graphic object. Each user's voting confidence level may be displayed in each voting zone to illustrate how confident each user is of his or her vote. The user who applies the highest (normalized) pressure is considered to have the highest confidence, and the solution state corresponding to that zone becomes the group's proposed answer.

In some embodiments where an interactive input system is not capable of detecting or inferring applied pressure, the system uses the amount of time (voting confidence level) each user has touched his or her voting zone. If a particular voting zone has multiple contacts, this may be resolved as either the longest or the average time duration of the multiple contacts that have been applied. The amount of time duration is calculated according to a step size that may be configured with the graphic object or alternatively according to a system default (e.g., 1 second). Each user's voting time may be displayed in each his/her voting zone to display the level of confidence had by each user in their respective vote. The user touching their voting zone for the longest period of time causes that voting zone to win the vote, at which point the answer corresponding to that voting zone becomes the answer for the group.

Figure 11:
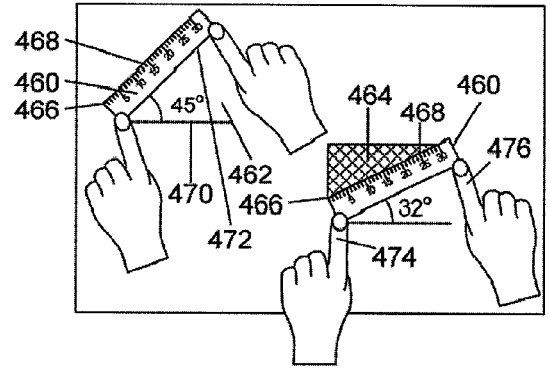
FIG. 11 is an illustration of manipulation of the angle of rotation, the length and the position of a graphic object using rotation, translation and scaling gestures to reach a solution state for a graphic object that is dependent upon the length and angle characteristics of another graphic object.

FIG. 11 is an illustration of manipulation of the angle of rotation, the length and the position of a ruler graphic object 460 using rotation, translation and scaling gestures to reach a solution state for the ruler graphic object 460 that is dependent upon the length and angle characteristics of a triangle graphic object 464. Ruler graphic object 460 is intended for use to measure an angle 462 and also to measure the angle and length of the hypotenuse of triangle graphic object 464. The vertex 466 and the edge 468 of the ruler graphic object 460 are associated with the question. When measuring the angle 462, the user is expected to translate and rotate the ruler so that the vertex 466 overlaps with the vertex of the angle 462, and the edge 468 aligns with the first edge 470 of the angle 462. Then, the user is expected to rotate the ruler 460, while maintaining the vertex 466 fixed, to the second edge 472 of the angle. The measured value is displayed on the screen.

When measuring the angle and length of the hypotenuse, the user is expected to overlap the vertex 466 of the ruler graphic object 460 with one end of the hypotenuse, and to rotate the ruler graphic object 460 to align then edge 468 of the ruler graphic object 460 with the hypotenuse. The user may contact one pointer 474 to the vertex 466 and another pointer 476 to another location on the ruler graphic object 460, and may then move pointer 476 away from (or towards) the pointer 474 to increase (or decrease) the length of the ruler graphic object 460. The angle of the hypotenuse with respect to the x-axis of the display surface (i.e., the horizontal axis) is displayed. The user is expected to read the length of the hypotenuse from the ruler graphic object 460. Alternatively, the user may be required to place a finger at the 0 point on the ruler and another finger at where the other vertex of the triangle measures to on the ruler for a period of time in order to confirm the user's answer.

Alternatively, the user may align the edge 468 of the ruler graphic object 460 to the first edge of the triangle graphic object 464 connecting the hypotenuse and overlap the vertex 466 of the ruler graphic object 460 with the vertex connect the first edge and the hypotenuse of the triangle graphic object 464, and then rotate the ruler graphic object 464 to align it with the hypotenuse. The user may increase or decrease the length of the ruler graphic object 460 to read its length.

Figure 12:
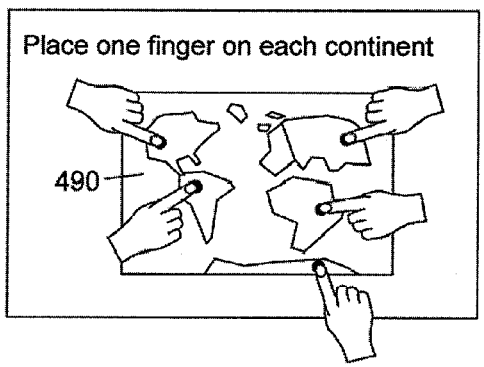
FIG. 12 is an illustration of manipulation of the number of touch points and their particular touch location on a graphic object to reach a solution state for the graphic object.

FIG. 12 is an illustration of manipulation of the number of touch points and their particular touch locations on a map graphic object 490 to reach a solution state for the map graphic object 490. The map graphic object 490 is presented on the display screen, and a point of each continent is associated with a question, and is represented by a dot. The question/problem statement asks the users to place a finger on each continent. The solution state of the map graphic object 490 requires that a contact point coincide with each dot. In an alternative embodiment, rather than merely a dot, the solution state requires simply that a contact point coincide with some position on each continent area.

Figure 13:
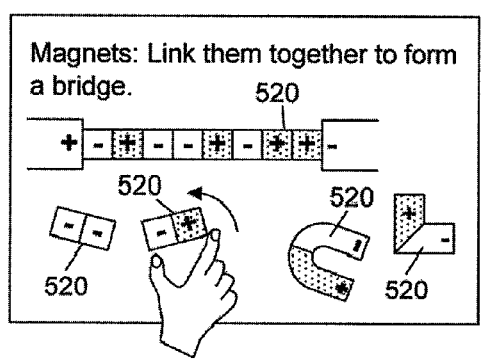
FIGS. 13 and 14 are illustrations of manipulation of both the angle of rotation and the position of graphic objects using rotation and translation gestures to reach a solution state for each graphic object that is dependent upon its relative position with respect to other graphic objects.
Figure 14:
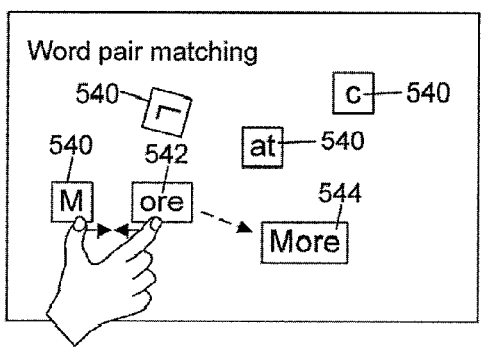

FIGS. 13 and 14 are illustrations of manipulation of both the angle of rotation and the position of graphic objects using rotation and translation gestures to reach a solution state for each graphic object that is dependent upon its relative position with respect to other graphic objects. In FIG. 13, a number of magnet graphic objects 520 are displayed on the screen. The neighboring properties of each magnet object, including the neighboring objects on the left and right sides, the polarity of the neighboring objects, the distance to the neighboring objects, etc., are associated with the question. The student is asked to arrange the magnet objects to make a bridge, and the solution state requires that the magnet objects be rotated and translated so that they are aligned in a row with properly matched polarities. When two magnet objects are aligned with matched polarities and with a distance smaller than a predefined threshold, they are snapped together. In the event that a magnet is left without a connection to another magnet or to the two main poles (on the left and right sides of FIG. 13), the commitment trigger in this event being the release of a contact point on the magnet due to the solution state not having been reached for that magnet causes an indication as a result of invoking of a hint routine which causes the magnet to settle to the bottom of the display surface. The user is then provided with the hint that the magnet is to be connected to other magnets to form a bridge. Similarly, in the event that the user attempts to place a magnet such that one of its poles is adjacent a like pole of another magnet, the commitment trigger due to the solution state not having been reached for that magnet causes an indication as a result of invoking another hint routine which causes the magnet to be repelled from the neighboring magnet.

FIG. 14 illustrates an exemplary word pairing question. A number of letter graphic objects 540 are displayed on the screen. The user is expected to align some of the letter graphic objects 540 to form a word. For example, graphic object 542 is a partly formed word. The neighboring properties of a letter graphic object 540 or a word graphic object 542, including the neighboring graphic object, its letter, etc., are associated with the question. In order to reach the solution state, the student may use two fingers to align two letter graphic objects 540 (or to align with partly formed word graphic objects 540) in a proper order. When the two graphic objects are properly selected and in a proper order (i.e., they can at least partly form a correct word), and the distance between the two graphic objects is less than a predefined threshold, the two graphic objects are merged to form a new graphic object 544 representing a word, whether partly formed or complete in and of itself. The two original graphic objects are also deleted. In this example, the orientation of the graphic objects, when aligning together, is irrelevant, as they are automatically rotated into accordance when aligned.

FIGS. 15A and 15B are illustrations of manipulation of the position of a graphic object 562 using a translation gesture to reach a solution state for the graphic object 562 that is dependent upon its relative position with respect to another graphic object 560. In particular, an arm graphic object 560 and a word graphic object 562 are displayed on the display screen. The neighboring properties of the graphic objects 560, 562, including the name of each mutually neighboring object, the distance of each mutually neighboring object, etc., are associated with the question. In order to reach the solution state for a graphic object, the user is expected to translate one object (e.g., word graphic object 562) to at least partly overlap with the other object (e.g. the arm graphic object 560). In this example, a pressure commitment method (see FIG. 15B) to trip the commitment trigger for and providing an indication, such as a beep or a buzz, as to whether the graphic object 562 (and the arm graphic object 560) is in its solution state.

Figure 16:
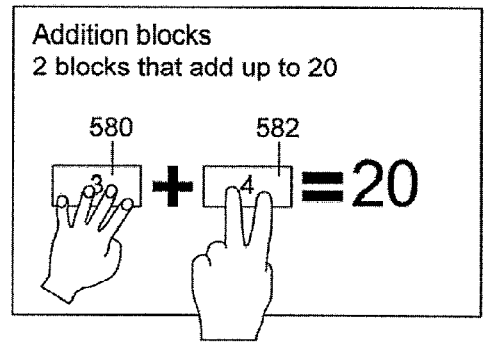
FIG. 16 is an illustration of manipulation of the number of touch points on two graphic objects to reach a super solution state that requires that each of the two graphic objects are in their respective solution states.

FIG. 16 is an illustration of manipulation of the number of touch points on two graphic objects 580 and 582 to reach a super solution state that requires that each of the two graphic objects 580, 582 are in their respective solution states. More particularly, the two block graphic objects 580 and 582 are presented on the display screen, and their areas are each associated with a question. Each block displays a number. The user is expected to contact the block graphic objects 580, 582 with multiple pointers such as fingers to adjust the number displayed in the block graphic objects 580, 582 so that the total is the number 20. The number of contact points on a block graphic object is employed as a multiplier for the number displayed in the respective block graphic object 580 or 582. As shown in this figure, the block graphic objects 580 and 582, respectively, contain the numbers 3 and 4. Four contact points on the display surface over block graphic object 580 invoke a multiplier of 4 applied thereto, and two contact points on the display surface over block graphic object 582 invoke a multiplier of 2 applied thereto. In this way, the solution state is reached. In general, evaluation includes multiplying the current number of contact points on the graphic object with a predetermined value and determining whether the resultant product matches the solution state. The number of contact points may be considered a quantity gesture.

FIGS. 17A, 17B, 17C and 17D are illustrations of manipulation of the position and size of graphic objects using translation and rotation gestures, respectively, to reach respective solution states that are dependent upon characteristics of other graphic objects. In FIG. 17A, a question 600 is presented on the display screen, and two graphic objects 602 and 604 are also presented. Similarly, two ruler objects 606 and 608 are presented, and their length and neighboring (including the neighboring object) properties are associated with the question. In order to reach the solution state for either of the graphic objects 606, 608, the user is expected to manipulate the length of the ruler object 608 so that its length is twice the length of the ruler object 606. After the user trips the commitment trigger, the length of ruler graphic object 608 is compared with the length of the neighboring ruler graphic object 606 to determine whether the solution state has been reached, and to provide an indication as to whether the solution state has been reached.

In FIG. 17B, a question/problem statement 620 is presented, as are two illustrative graphics objects 622 and 624. Two additional graphic objects 626 and 628 are also presented, and their size and neighboring (including the neighboring object) properties are associated with the question. The user is expected to scale the size of the graphic object 628 so that its size is twice that of the graphic object 626. When the student begins to scale the graphic object 628, visual feedback, e.g., the grid 630, is provided automatically to assist the student with answering the question. After the student commits to a proposed solution by using an aforementioned commitment trigger, the size of graphic object 628 is detected and compared with the size of the neighboring graphic object 626 to evaluate whether the proposed solution accords with the solution state.

In FIGS. 17C and 17D, a question 660 is presented on the display surface, as are two illustrative graphic objects 662 and 664. Two additional graphic objects 666 and 668 are also presented, and their size and neighboring (including the neighboring object) properties are associated with the question. The user is expected to rotate the graphic object 668 in order to adjust its size such that it is two-thirds (⅔) the size of graphic object 666. Visual feedback, e.g., the grid 670, is automatically provided for both graphic objects 666 and 668, respectively, to assist the user with proposing a solution. After the student commits to a proposed solution, the size of graphic object 668 is compared with that of the neighboring graphic object 668 to determine whether the proposed solution accords with the solution stated.

Those skilled in the art will appreciate that the above embodiments are for exemplary purposes only, and other embodiments of this invention are also available. For example, in the above exemplary embodiments, the instructor may select one or more objects and associate some properties of the selected objects with a question (the solution state for the graphic object that corresponds to a solution to a question/problem statement is then defined). In some alternative embodiments, the system may allow the instructor to select one or more objects and associate some properties of the selected objects with a group of questions (a default solution state for the graphic object that corresponds to a solution to each of the group of question/problem statements may be defined at the same time, and allow the instructor to modify later). For example, the instructor may select the ruler object and associate its length property with all questions that are assigned to Math class, or may select the coin object, which may be flipped by touching thereon, to all probability questions. The system may further allow the instructor to define a group of questions that a graphic object may be used as an educational tool therein.

The embodiments described above are only exemplary. Those skilled in the art will appreciate that the same techniques can also be applied to other collaborative interaction applications and systems, such as, direct touch systems that use graphical manipulation for multiple people, such as, touch tabletop, touch wall, kiosk, tablet, interactive whiteboard, etc, and systems employing distant pointing techniques, such as, laser pointers, IR remote, etc.

Also, although the embodiments described above are based on multi-touch interactive input systems, those of skill in the art will appreciate that many of the same techniques can also be applied in single-touch interactive input system, and enable a user to select and manipulate graphic objects by using a single pointer.

Those of skill in the art will also appreciate that the same methods of manipulating graphic objects described herein may also apply to different types of touch technologies such as surface-acoustic-wave (SAW), analog-resistive, electromagnetic, capacitive, IR-curtain, acoustic time-of-flight, or machine vision-based systems with imaging devices looking across the display surface.

The interactive input system may comprise program modules including but not limited to routines, programs, object components, data structures etc. and may be embodied as computer readable program code stored on a computer readable medium. The computer readable medium is any data storage device that can store data, which can thereafter be read by a computer system. Examples of computer readable media include for example read-only memory, random-access memory, flash memory, CD-ROMs, magnetic tape, optical data storage devices and other storage media. The computer readable program code can also be distributed over a network including coupled computer systems so that the computer readable program code is stored and executed in a distributed fashion or copied over a network for local execution.

Those of skill in the art will understand that collaborative decision making is not limited solely to a single display surface and may be extended to online conferencing systems where users at different locations could collaboratively manipulate one or more graphic objects. The icons for activating the collaborative action would display in a similar timed manner at each remote location as described herein. Similarly, a display surface employing an LCD or similar display and an optical digitizer touch system could be employed.

Although the FTIR embodiment described above uses three mirrors, those of skill in the art will appreciate that different mirror configurations are possible using fewer or greater numbers of mirrors depending on configuration of the cabinet 16. Furthermore, more than a single imaging device 32 may be used in order to observe larger display surfaces. The imaging device(s) 32 may observe any of the mirrors or observe the display surface 15. In the case of multiple imaging devices 32, the imaging devices 32 may all observe different mirrors or the same mirror.

Furthermore, while level of pressure is based on the size of a touch point, in an alternative embodiment a pressure sensor may be coupled to the touch surface and/or the pointer itself to detect the pressure of the touch.

Although preferred embodiments of the present invention have been described, those of skill in the art will appreciate that variations and modifications may be made without departing from the spirit and scope thereof as defined by the appended claims.

What is claimed is:

1. An interactive input system comprising:
a display surface;
a touch sensitive input; and
processing structure communicating with the display surface and the touch sensitive input, the processing structure configured to:
present on the display surface at least one graphic object and a predetermined value, the graphic object comprising a solution state that is a multiple of the predetermined value;
detect a number of contact points in contact with the graphic object on the display surface; and
evaluate whether the graphic object is in its solution state by multiplying the number of contact points with the predetermined value.

2. The interactive input system of claim 1, wherein the processing structure is further configured to:
provide an indication as to whether the graphic object is in its solution state in response to the application of an amount of pressure that is within a range of pressures against the display surface in association with the graphic object.

3. The interactive input system of claim 2, wherein the range of pressures is a set of discrete pressure amounts.

4. The interactive input system of claim 3, wherein there are six or fewer discrete pressure amounts.

5. The interactive input system of claim 1, wherein the processing structure provides an indication as to whether the graphic object is in its solution state in response to the application of the amount of pressure against the display surface in association with the graphic object for a predetermined period of time.

6. The interactive input system of claim 5, wherein the predetermined period of time is about one second.

7. A method of handling user input in an interactive input system comprising:

presenting on a display surface of the interactive input system at least one graphic object and a predetermined value, the graphic object comprising a solution state that is a multiple of the predetermined value;

detecting a number of contact points in contact with the graphic object on the display surface; and evaluating whether the graphic object is in its solution state by multiplying the number of contact points with the predetermined value.

8. The method of claim 7 further comprising:

in response to the application of an amount of pressure that is within a range of pressures against the display surface in association with the graphic object, providing an indication as to whether the graphic object is in its solution state.

9. The method of claim 8, wherein the range of pressures is a set of discrete pressure amounts.

10. The method of claim 9, wherein there are six or fewer discrete pressure amounts.

11. The method of claim 8, further comprising providing an indication as to whether the graphic object is in its solution state in response to the application of the amount of pressure against the display surface in association with the graphic object for a predetermined period of time.

12. The method of claim 11, wherein the predetermined period of time is about one second.

13. A non-transitory computer readable medium embodying a computer program for handling user input in an interactive input system, the computer program comprising program code for:

presenting on a display surface of the interactive input system at least one graphic object and a predetermined value, the graphic object comprising a solution state that is a multiple of the predetermined value;

detecting a number of contact points in contact with the graphic object on the display surface; and evaluating whether the graphic object is in its solution state by multiplying the number of contact points with the predetermined value.

14. The non-transitory computer readable medium of claim 13 comprising further program code for:

providing an indication as to whether the graphic object is in its solution state in response to the application of an amount of pressure that is within a range of pressures against the display surface in association with the graphic object.

15. The non-transitory computer readable medium of claim 14, wherein the range of pressures is a set of discrete pressure amounts.

16. The non-transitory computer readable medium of claim 15, wherein there are six or fewer discrete pressure amounts.

17. The non-transitory computer readable medium of claim 14, comprising further program code for providing an indication as to whether the graphic object is in its solution state in response to the application of the amount of pressure against the display surface in association with the graphic object for a predetermined period of time.

18. The non-transitory computer readable medium of claim 17, wherein the predetermined period of time is about one second.

* * * * *